(12) United States Patent
Shiraishi

(10) Patent No.: US 7,456,985 B2
(45) Date of Patent: Nov. 25, 2008

(54) IMAGE FORMING APPARATUS THAT PERFORMS WIRELESS COMMUNICATION WITH RADIO TAG ATTACHED TO DOCUMENT OR RECORDING MEDIUM

(75) Inventor: Naoto Shiraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 376 days.

(21) Appl. No.: 11/207,827

(22) Filed: Aug. 22, 2005

(65) Prior Publication Data

US 2006/0072142 A1  Apr. 6, 2006

(30) Foreign Application Priority Data

Sep. 29, 2004  (JP)  ............... 2004-283214
May 31, 2005  (JP)  ............... 2005-160325

(51) Int. Cl.
*G06F 15/00* (2006.01)
*G06K 1/00* (2006.01)
*G06K 15/00* (2006.01)
*G06K 7/10* (2006.01)
*H04Q 5/22* (2006.01)
*G08B 13/14* (2006.01)

(52) U.S. Cl. ............... 358/1.14; 340/572.1; 340/10.1; 340/10.52

(58) Field of Classification Search ............... 358/1.14; 340/572.1, 10.1, 10.52
See application file for complete search history.

(56) References Cited

U.S. PATENT DOCUMENTS

| 6,972,856 B1 * | 12/2005 | Takahashi | ............... 358/1.14 |
|---|---|---|---|
| 6,972,859 B1 * | 12/2005 | Patton et al. | ............... 358/1.15 |
| 7,095,514 B1 * | 8/2006 | Yamagata et al. | ............... 358/1.14 |
| 2002/0054692 A1 * | 5/2002 | Suzuki et al. | ............... 382/100 |
| 2003/0193694 A1 * | 10/2003 | Shimazawa et al. | ............... 358/3.28 |
| 2004/0042830 A1 * | 3/2004 | Kaburagi et al. | ............... 399/366 |
| 2004/0257601 A1 * | 12/2004 | Tomiyasu et al. | ............... 358/1.9 |
| 2005/0094183 A1 * | 5/2005 | Kojima | ............... 358/1.14 |

FOREIGN PATENT DOCUMENTS

| JP | 2-210591 | 8/1990 |
|---|---|---|
| JP | 6-54186 | 2/1994 |
| JP | 6-105136 | 4/1994 |

OTHER PUBLICATIONS

Ichiro Shiio, et al., "Attaching Information to Objects-RFID Tag and its Application"-, IPSJ Magazine, vol. 40, No. 8, Aug. 1999, pp. 846-850 (with English translation).

* cited by examiner

*Primary Examiner*—Twyler L. Haskins
*Assistant Examiner*—Fred Guillermety
(74) *Attorney, Agent, or Firm*—Oblon, Spivak, McClelland, Maier & Neustadt, P.C.

(57) ABSTRACT

An image forming apparatus, which forms an image of a document on a recording medium, includes: a transport path through which the recording medium is transported; a transferring unit that is arranged on the transport path and transfers the image to the recording medium; a carrying unit that is arranged on the transport path and carries the recording medium to the transferring unit; and an acquiring unit that is arranged between the carrying unit and the transferring unit and acquires identification information from a radio tag attached to the recording medium.

8 Claims, 31 Drawing Sheets

RADIO TAG INFORMATION

RADIO TAG ACCESS RECORD (EXAMPLE OF CASH VOUCHER)

| | | |
|---|---|---|
| (1) | TIME: | 2003/09/10:12:30 |
| (2) | TYPE: | GIFT CERTIFICATE |
| (3) | MANUFACTURER: | XXXXX |
| (4) | TERMS OF VALIDITY: | 01/01/2002 TO 01/01/2010 |
| (5) | REGISTRATION NUMBER: | 0123456789 |

RADIO TAG INFORMATION

RADIO TAG ACCESS RECORD (EXAMPLE OF BOOK)
- (1) TIME: 2003/09/10:12:30
- (2) TYPE: BOOK
- (3) MANUFACTURER: IWANAMI BUNKO
- (4) TITLE: ASAHI WEEKLY

IMAGE FORMING APPARATUS THAT PERFORMS WIRELESS COMMUNICATION WITH RADIO TAG ATTACHED TO DOCUMENT OR RECORDING MEDIUM

CROSS-REFERENCE TO RELATED APPLICATIONS

The present document incorporates by reference the entire contents of Japanese priority documents, 2004-283214 filed in Japan on Sep. 29, 2004 and 2005-160325 filed in Japan on May 31, 2005.

BACKGROUND OF THE INVENTION

1. Field of the Invention

The present invention relates to an image forming apparatus that performs a wireless communication with a radio tag attached to a document or a recording medium on which an image of the document is to be formed.

2. Description of the Related Art

Recently, along with improvements in the image quality of image forming apparatuses (such as digital copying machines and copiers), there is an increasing risk of copying to forge documents with respect to specific documents such as bank notes and securities, for which copying is prohibited. Therefore, an image processor has been proposed, which corrects the characteristic of an input color image signal, extracts the characteristic in the obtained corrected image signal, to determine the similarity between the extracted characteristic and the characteristic of a prepared specific document, and changes the processing content of the input color image signal corresponding to the similarity (see, for example, Japanese Patent Application Laid-Open No. H6-105136).

Furthermore, there is an image recognizing apparatus that registers image patterns of specific documents beforehand, compares an input image pattern with the registered image patterns to determine the similarity, and determines whether the input image is the one of a specific document based on the determined similarity, to prevent the specific document from being forged (see, for example, Japanese Patent Application Laid-Open Nos. H2-210591 and H6-54186).

Meanwhile, ID element (Radio Frequency Identification (RFID)) technology for holding individual information electronically, to transmit information by electromagnetic induction in a non-contact manner has been developed, and adapted for identification control of goods. The individual recognizing method using the ID element is attracting attention as a technique replacing barcodes in the distribution industries (see, for example, "Putting Information to Things: RFID Tags and Their Applications", by SHIIO Ichiro and HAYASAKA Toru, Journal of Information Processing, August 1999, Vol. 40, No. 8, pp. 846 to 850).

Particularly, forgery of cash vouchers, concert tickets and the like can be prevented by storing special coded data in a radio tag. Furthermore, the radio tag attached to the cash vouchers, concert tickets and the like has an antenna built in an LSI, the communication distance with a reader/writer is as short as one millimeter to several centimeters.

As another method for preventing copy of bank notes or securities, there is a method such that, at the time of copying bank notes or securities, a tracking pattern indicating information specifying the type of machine or the machine number of an image forming apparatus that made the copy is added to the image of the bank notes or securities and output. Accordingly, forgery of bank notes or securities by copying the bank notes or securities can be prevented.

Furthermore, due to recent popularization of information technology (IT) including the Internet and personal computers (PCs), various types of electronic information is created in the intelligent manufacturing activities, and the information is output onto a recording medium such as paper and overhead projector (OHP) sheets by an image forming apparatus such as a copying machine and a printer. The output paper or document is distributed in meetings and the like as information sharing means, and is used in the intelligent manufacturing activities. The distributed paper or document is brought home by the recipient, and stored as it is, or converted to a Joint Photographic Experts Group (JPEG) image file by an image reader such as a scanner, and stored. To use the information as an information source for further intelligent manufacturing activities, the distributed paper or document is further copied, directly output from the converted JPEG image file, or the image file is processed by a personal computer and output. Thus, while the received paper or document is analog information, it is desired to handle it as digital information to reuse or reprocess the information, and the conversion from the analog information to the digital information is performed by using an optical image reader.

However, in the conventional technique, the recent high quality image of printers enables forgery of securities and cash vouchers. To prevent the forgery, a technique for embedding a radio tag in the securities and cash vouchers has been known, but basically, read and write of the content of the radio tag is possible. Accordingly, forgery of the radio tag itself is possible, though not so easy.

According to the image forming apparatus using the forgery prevention technique, forgery becomes difficult, but a method in which an image is read by a simple personal image reader such as a scanner, and the image is formed and forged by the image forming apparatus can be considered. For example, the securities or cash vouchers can be color-printed on a white paper in which the radio tag is embedded. Hence, it is necessary to prevent such forgery.

When the distributed paper or document is copied, there is a disadvantage in that there is only analog information on the document, and the image quality is deteriorated inevitably at the time of converting the analog information to the digital information by the image reader. That is, texts, graphs, tables, and images are present together on a document, but the image reader obtains the digital information, assuming all of these as image information. However, at the time of optical conversion by the image reader, deterioration in the image quality occurs due to physical factors such as modulation transfer function (MTF) characteristic of lenses or a charge coupled device (CCD). Furthermore, the image information has a large amount of information, and compression according to image processing such as image compression is generally used. However, there is a problem in that deterioration in the image quality occurs depending on the compressibility in the image compression. Furthermore, texts included in the document can be extracted as text data according to image processing by, for example, an optical character reader (OCR), but there is a problem in that deterioration in the information quality from the document due to the conversion accuracy occurs.

Furthermore, to use the information distributed as paper or document, there are several methods, that is, to create electronic information newly by a PC by referring to the paper or document, to fetch the information as an image file such as the JPEG image file by using an image reader, and to obtain the electronic information of the document itself by inquiring the information originator. However, those methods require time and labor. In other words, the document is electronically created by the originator by using a PC, and output by a printer, and hence, there is the electronic information of the document itself. While the electronic information can be distributed together with the document, since it is necessary to distribute the information by storing the information on another recording medium such as floppy disk (FD), CD-ROM, or CD-R, or to transmit the information in e-mails via the Internet separately. Accordingly, it requires time and labor to distribute the electronic information.

Recently, along with improvements in the image quality of the image forming apparatuses such as copying machines, when a book or the like is copied by a copying machine in public libraries or corporate libraries, there is a problem of infringing on the copyright of a publisher by copying the book.

SUMMARY OF THE INVENTION

It is an object of the present invention to at least solve the problems in the conventional technology.

An image forming apparatus according to an aspect of the present invention, which forms an image of a document on a recording medium, includes: a transport path through which the recording medium is transported; a transferring unit that is arranged on the transport path and transfers the image to the recording medium; a carrying unit that is arranged on the transport path and carries the recording medium to the transferring unit; and an acquiring unit that is arranged between the carrying unit and the transferring unit and acquires identification information from a radio tag attached to the recording medium.

A method according to another aspect of the present invention, which is a method of forming an image of a document on a recording medium, includes: transferring the recording medium through a transport path; and acquiring identification information from a radio tag attached to the recording medium while the recording medium being transferred.

An image forming apparatus according to still another aspect of the present invention, which forms an image of a document on a recording medium and is connected, via a network, to an accounting system that charges a user for a usage of the document, includes: an acquiring unit that is arranged in a traveling unit for scanning the document and acquires information from a radio tag attached to the document; and an accounting unit that performs accounting processing for the document by accessing the accounting system based on the information.

An image forming system according to still another aspect of the present invention, which forms an image of a document on a recording medium, includes: an acquiring unit that acquires data from a radio tag attached to the document; a generating unit that generates the image of the document based on the data acquired; and an accounting unit that performs accounting processing for the document based on the data acquired.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be explained below in detail with reference to the accompanying drawings.

According to a first embodiment of the present invention, there is an antenna in a carrier unit for communicating with a radio tag on a carried sheet concurrently with printing, so that image processing at the time of image forming can be changed. The communication with the radio tag on the carried sheet is performed by the antenna, concurrently with the image forming, to recognize the type of the radio tag, and forgery prevention processing is performed when the radio tag is to be forgery-prevented, thereby preventing forgery. Furthermore, the carrier unit has a dummy antenna, dummy radio wave is transmitted at the time of first printing, and by determining whether a system for detecting the radio tag on the carried sheet normally operates, a forgery prevention function of the equipment is normally operated. The first embodiment will be explained specifically below.

Figure 1:
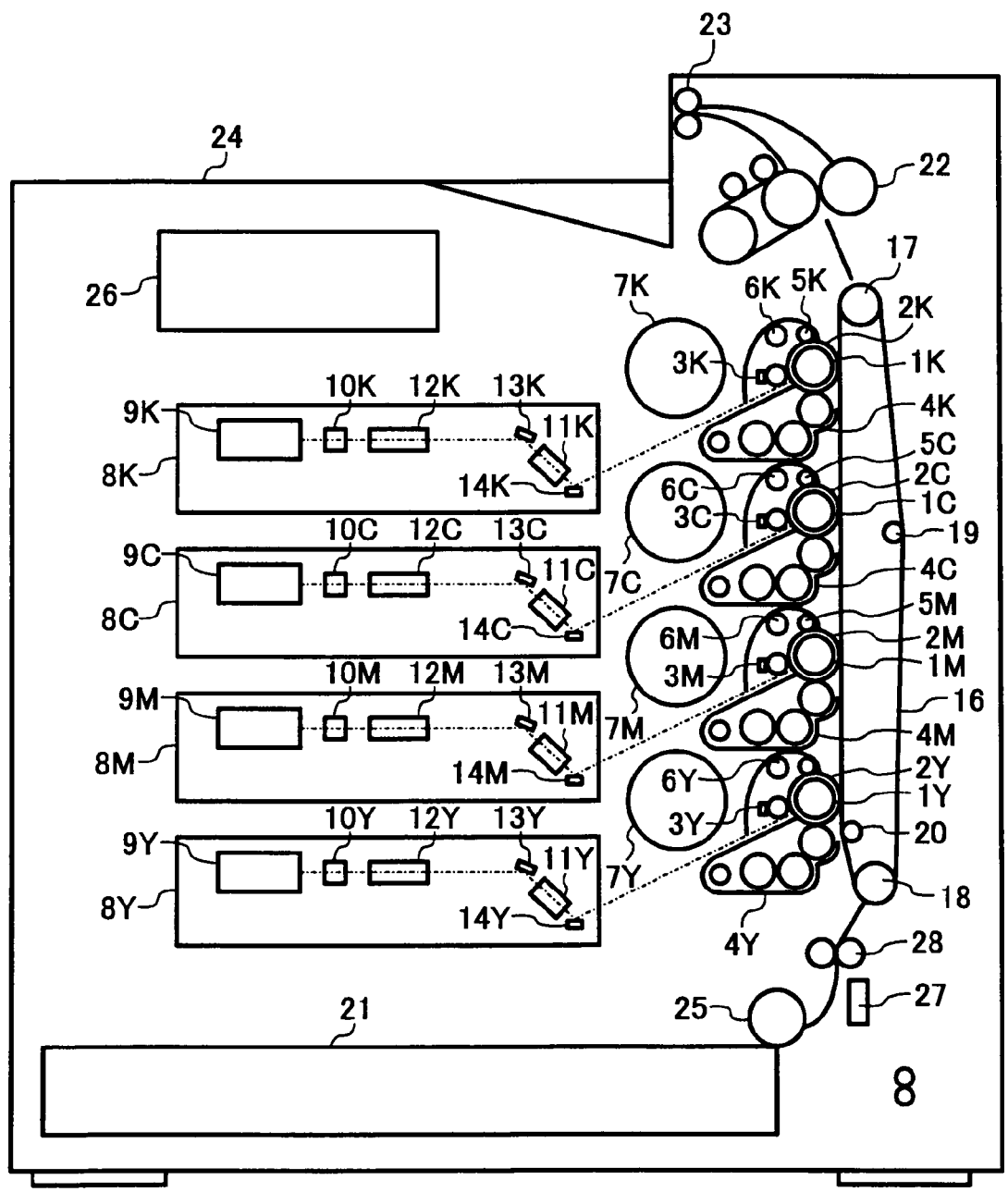
FIG. 1 is a diagram of an image forming apparatus according to a first embodiment of the present invention.

FIG. 1 is a diagram of an image forming apparatus according to a first embodiment of the present invention. The image forming apparatus in FIG. 1 is assumed to be a color printer. While a laser color printer is explained as an example in the first embodiment, the printer can be other color printers such as an ink jet printer.

The image forming apparatus shown in FIG. 1 is of four-drum tandem engine type that forms images of four colors (yellow (Y), magenta (M), cyan (C), and black (K)) by imaging systems 1Y, 1M, 1C, and 1K arranged respectively independently, according to laser beam write and the electrophotographic process, and the four color images are sequentially superposed, transferred, and synthesized onto a recording medium.

Each imaging system 1Y, 1M, 1C, and 1K includes a photoconductor as an image carrier, for example, an organic photoconductor (OPC) drum 2Y, 2M, 2C, and 2K having a small diameter. In the respective imaging systems 1Y, 1M, 1C, and 1K, a charging roller 3Y, 3M, 3C, and 3K as a charging unit, a development apparatus 4Y, 4M, 4C, 4K that develops an electrostatic latent image on the OPC drum 2Y, 2M, 2C, and 2K by a developer to form a toner image of respective colors of Y, M, C and K, a cleaning device 5Y, 5M, 5C, 5K, and a discharger 6Y, 6M, 6C, 6K are arranged from the upstream side of imaging so as to surround the OPC drum 2Y, 2M, 2C, and 2K.

A toner bottle unit 7Y, 7M, 7C, 7K that respectively supplies the predetermined color toner, Y toner, M toner, C toner, K toner to the development apparatus 4Y, 4M, 4C, 4K is arranged, respectively, on the side of each development apparatus 4Y, 4M, 4C, 4K. In the respective imaging systems 1Y, 1M, 1C, and 1K, an optical write unit 8Y, 8M, 8C, and 8K using laser beams are arranged independently, which respectively includes optical components such as a laser diode (LD) light source 9Y, 9M, 9C, 9K as a laser source, a collimate lens 10Y, 10M, 10C, 10K, and a fθ lens 11Y, 11M, 11C, 11K, a polygon mirror 12Y, 12M, 12C, 12K as a deflection scanning unit, and a mirror 13Y, 13M, 13C, 13K, 14Y, 14M, 14C, 14K.

The respective imaging systems 1Y, 1M, 1C, and 1K are vertically arranged, and a transfer belt unit 15 is arranged on the right thereof, so as to abut against the OPC drums 2Y, 2M, 2C, and 2K. In the transfer unit 15, a transfer belt 16 is laid across rollers 17 to 20 in a tensioned condition, and rotated by a driving source (not shown). A paper feed tray 21 in which recording media (recording paper in this embodiment) as a transfer material are stored is arranged in the lower part of the apparatus. A fixing apparatus 22 having a thermal fixing roller and a pressure roller, a paper ejection roller 23, and a paper ejection tray 24 are arranged on the upper part of the apparatus.

At the time of imaging, in the respective imaging systems 1Y, 1M, 1C, and 1K, the OPC drums 2Y, 2M, 2C, and 2K are rotated by a driving source (not shown) and uniformly charged by the charging rollers 3Y, 3M, 3C, and 3K, the optical writing units 8Y, 8M, 8C, and 8K respectively modulate a laser diode based on the image data of respective colors, and the laser beams are deflected to scan, to perform optical write on the OPC drums 2Y, 2M, 2C, and 2K, thereby forming an electrostatic latent image, respectively, on the OPC drums 2Y, 2M, 2C, and 2K.

Each electrostatic latent image on the OPC drum 2Y, 2M, 2C, and 2K is respectively developed by the development apparatus 4Y, 4M, 4C, 4K, to form a toner image of the respective colors. On the other hand, the recording medium is horizontally carried from the paper feed tray 21 by a carrier roller 25 and vertically carried by a transport system toward the imaging systems 1Y, 1M, 1C, and 1K. The recording medium is electrostatically attracted to and held on the transfer belt 16, and carried by the transfer belt 16, and applied with a transfer bias by a transfer bias applying unit (not shown). The toner images of respective colors Y, M, C, and K on the OPC drums 2Y, 2M, 2C, and 2K are sequentially superposed and transferred onto the recording medium, thereby forming a full color image on the recording medium. The recording medium, on which the full color image is formed, is ejected to the paper ejection tray 24 by the paper ejection roller 23, after the full color toner image is fixed by the action of the heat and pressure by the fixing apparatus 22. An electrical equipment controller 26 that performs drive control of the respective functional elements and executes various types of image processing is mounted.

Figure 2:
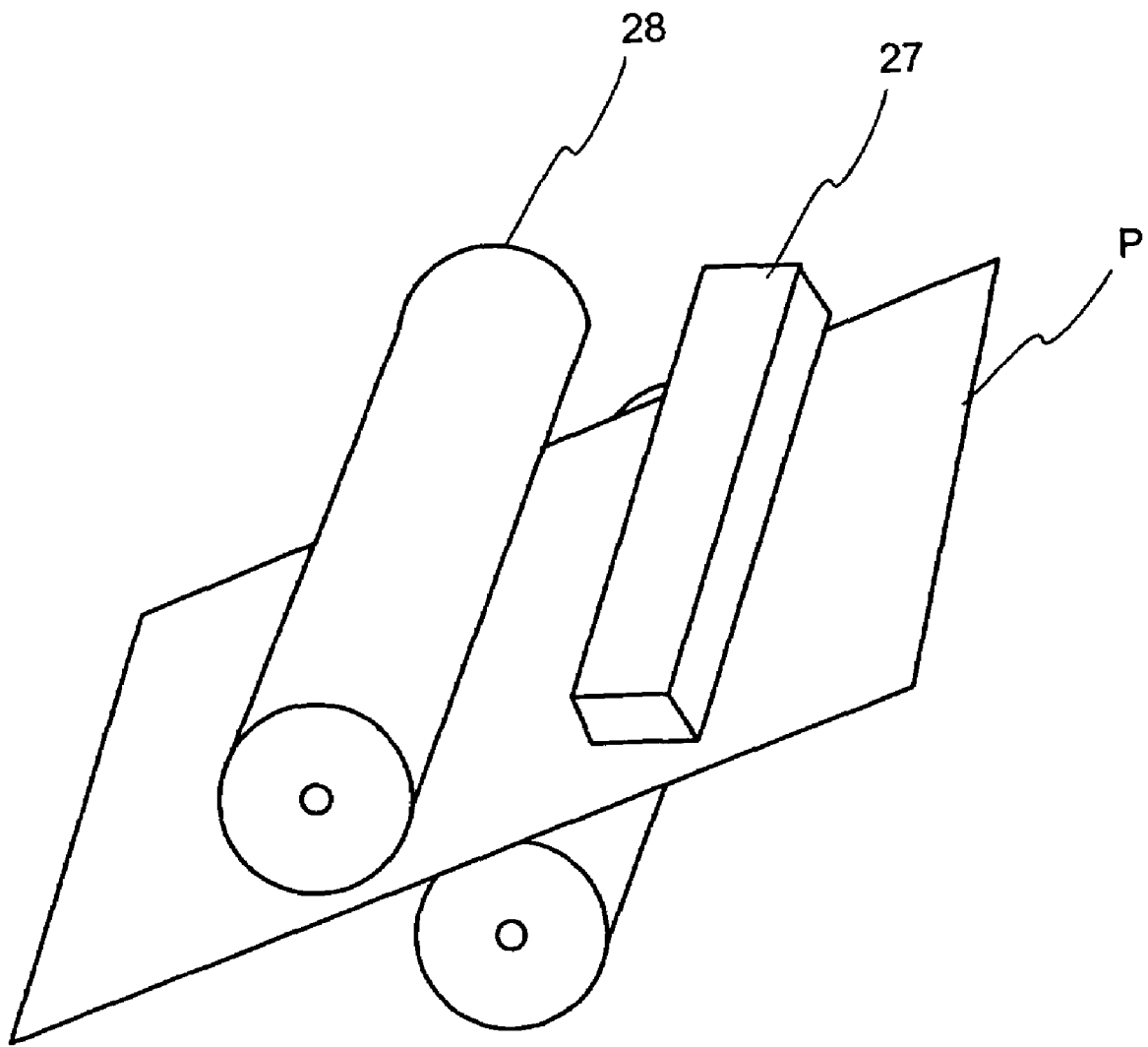
FIG. 2 is a diagram for explaining the relationship between an antenna and a transfer roller shown in FIG. 1.

Particularly, an antenna 27 that transfers radio waves is arranged immediately in front of a carrier roller pair 28 in the carrier unit in the image forming apparatus. The relationship between the carrier roller pair 28 and the antenna 27 is shown in FIG. 2. Thus, the antenna 27 is extended long, as shown in FIG. 2, in a direction perpendicular to the traveling direction of the recording medium P, so that the radio frequency identification (RFID) of the whole recording medium P can be detected.

Figure 3:
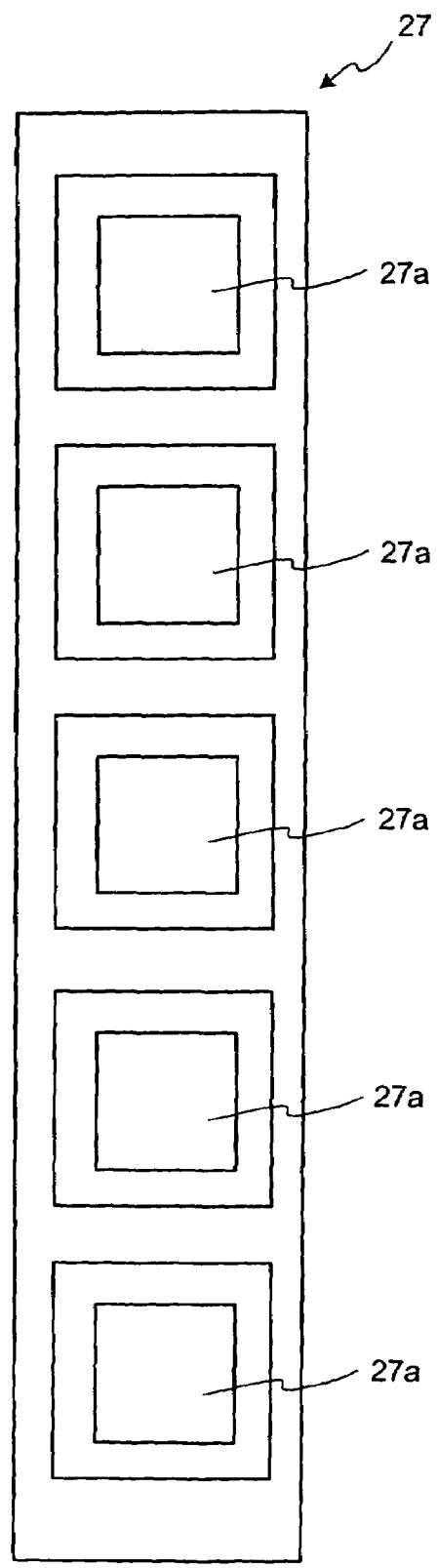
FIG. 3 is a diagram of an antenna shown in FIG. 1.

FIG. 3 is a diagram of the antenna shown in FIG. 1. A plurality of fine antennas 27a is used as an example. Thus, since one antenna is extended long, as shown in FIG. 2, in the direction perpendicular to the traveling direction of the recording medium P, the RFID can be found.

Figure 4:
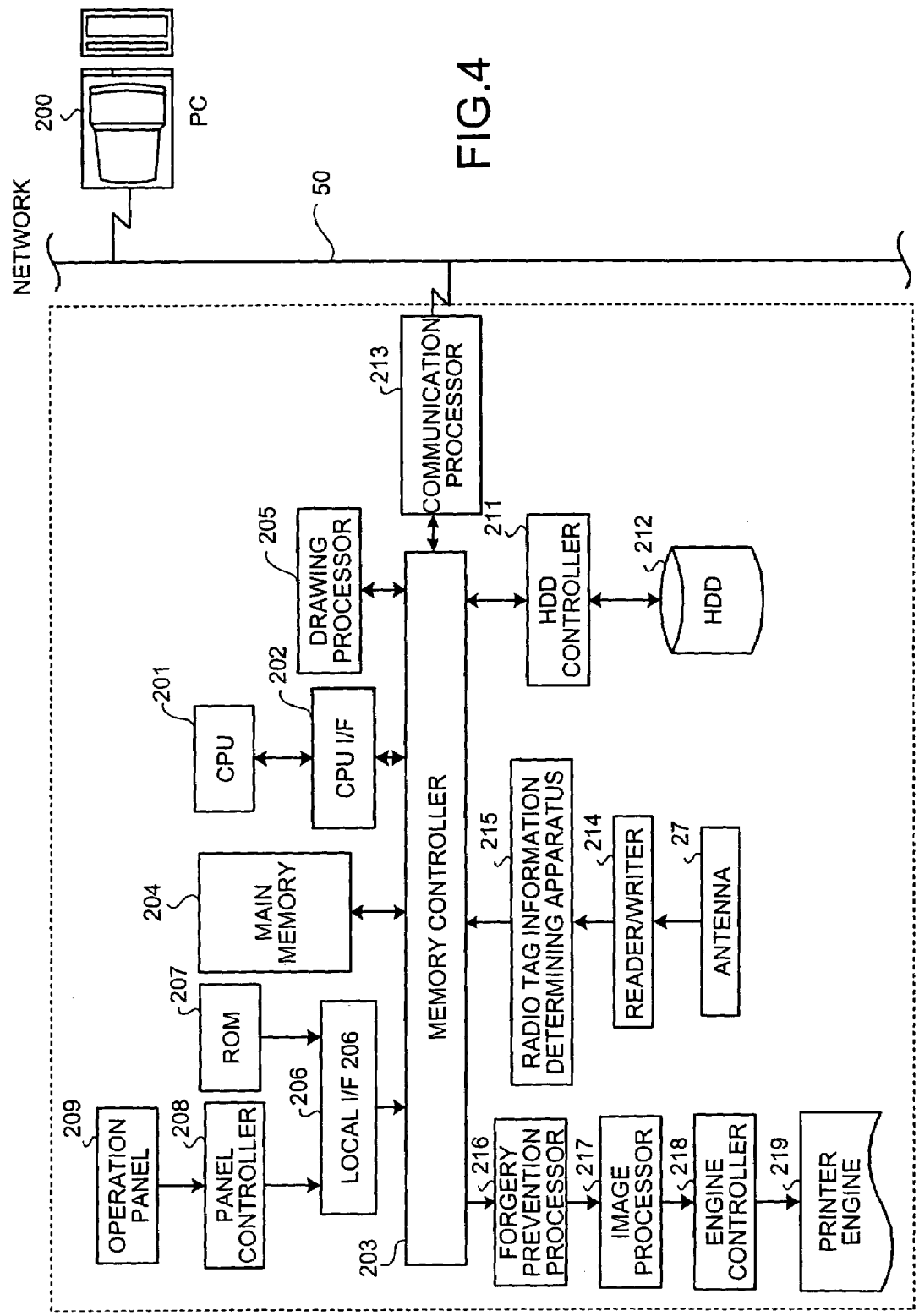
FIG. 4 is a block diagram of an electrical equipment controller shown in FIG. 1.

The specific configuration and operation of the image forming apparatus and the electrical equipment controller 26 will be explained. FIG. 4 is a block diagram of the electrical equipment controller 26 according to the first embodiment. A central processing unit (CPU) 201 executes analysis processing of the PDL or control of the entire image forming apparatus. A CPU interface (I/F) 202 is connected to a memory controller 203 to perform interface processing between the CPU 201 and the memory controller 203. The memory controller 203 controls a main memory 204 and controls transfer between the CPU 201, a local bus, a forgery prevention processor 216, and a communication processor 213 with the main memory 204. The main memory 204 stores the PDL of the image forming apparatus, programs for the CPU 201, and various types of data. A drawing processor 205 receives the PDL from a PC 200 and performs drawing processing into a page memory area in the main memory 204. A local I/F 206 executes interface processing between a read only memory (ROM) 207, a panel controller 208, and the like and the CPU 201, the main memory 204, and the like. The ROM 207 stores font information or programs for the CPU 201. The panel controller 208 controls an operation panel 209. The operation panel 209 is for inputting and setting operation from a user to the apparatus and displaying the state of the apparatus.

A hard disk drive (HDD) controller 211 controls an HDD 212. The communication processor 213 performs communication with the PC 200. A reader/writer 214 transmits a request to the radio tag to the antenna 27 and receives a response from the radio tag. The antenna 27 detects the radio tag at the time of transport and reads the information. A radio tag information determining apparatus 215 recognizes a serial number and the like of the radio tag transmitted from the reader/writer 214 and writes the information of the radio tag in a radio tag access memory area in the main memory 204. The forgery prevention processor 216 performs forgery prevention processing based on the determination result of the radio tag information determining apparatus 215. An image processor 217 performs image processing with respect to the image data from the forgery prevention processor 216 and transfers the processed image data to a printer engine 219. An engine controller 218 controls the printer engine 219. The printer engine 219 forms an image on a recording medium according to the image forming process as shown in FIG. 1. The PC 200 is connected to the image forming apparatus via a network 50. That is, the PC 200 creates an image file to be printed by the application software, and generates a page description language such as the PDL or a portable document format (PDF) by a printer driver, and transmits the page description language to the communication processor 213.

The network 50 can be of a type classified into a wide area network (WAN) that connects to the outside via a public line or a private line, and a local area network (LAN) that builds a network within the same area, or can be either one. When having the Internet function, the network 50 can be a transmission control protocol/Internet protocol (TCP/IP). The network 50 can use a connation by a radio LAN.

Figure 5:
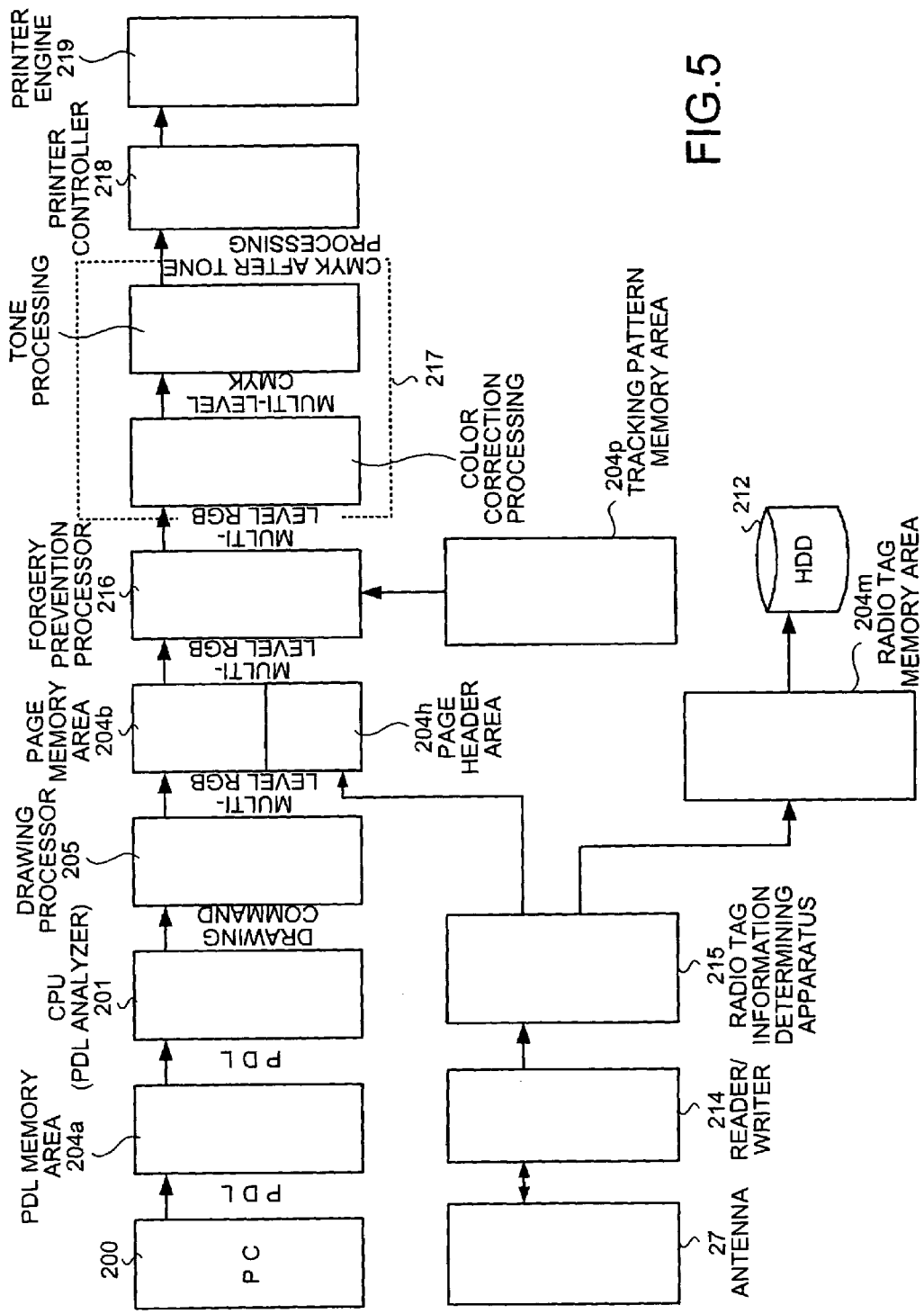
FIG. 5 is a block diagram illustrating the flow of image processing performed by the electrical equipment controller.

FIG. 5 is a block diagram illustrating the flow of image processing performed by the electrical equipment controller 26. The PC 200 generates the PDL and transfers it to the image forming apparatus, and transfers it to a PDL memory area 204a in the main memory 204. The PDL memory area 204a in the main memory 204 stores the PDL data from the PC 200. The CPU 201 generates an intermediate language by analyzing the PDL and transfers it to the drawing processor 205. The drawing processor 205 receives the intermediate language from the CPU 201 and draws in a page memory area 204b in the main memory 204. The page memory area 204b in the main memory 204 stores the page image drawn by the drawing processor 205.

The antenna 27 repeats transmission/reception of the radio wave to detect whether the recording medium has the radio tag at the time of transport. The reader/writer 214 transmits a request to the radio tag to the antenna 27 and receives a response from the radio tag, and when there is a response from the radio tag, the reader/writer 214 transmits the information of the radio tag to the radio tag information determining apparatus 215. The radio tag information determining apparatus 215 recognizes the serial number of the radio tag transmitted from the reader/writer 214, writes the information of the radio tag in a radio tag memory area 204m, and if a radio tag to be forgery-prevented is found, it is recorded in a page header area 204h that forgery prevention is necessary. The radio tag memory area 204m in the main memory 204 stores the content of the accessed radio tag. The HDD 212 stores the content of the radio tag memory area 204m as a secondary memory. When it is determined that forgery prevention is necessary in the radio tag memory area 204m, the forgery prevention processor 216 performs forgery prevention processing by reading a tracking pattern. A tracking pattern memory area 204p stores the tracking pattern for the processing by the forgery prevention processor 216. The image processor 217 performs color conversion with respect to the image data from the forgery prevention processor 216. The image processor 217 also performs tone processing with respect to the one-color corrected data. The printer engine 212 prints out the data after the tone processing via the engine controller 218.

Figure 6:
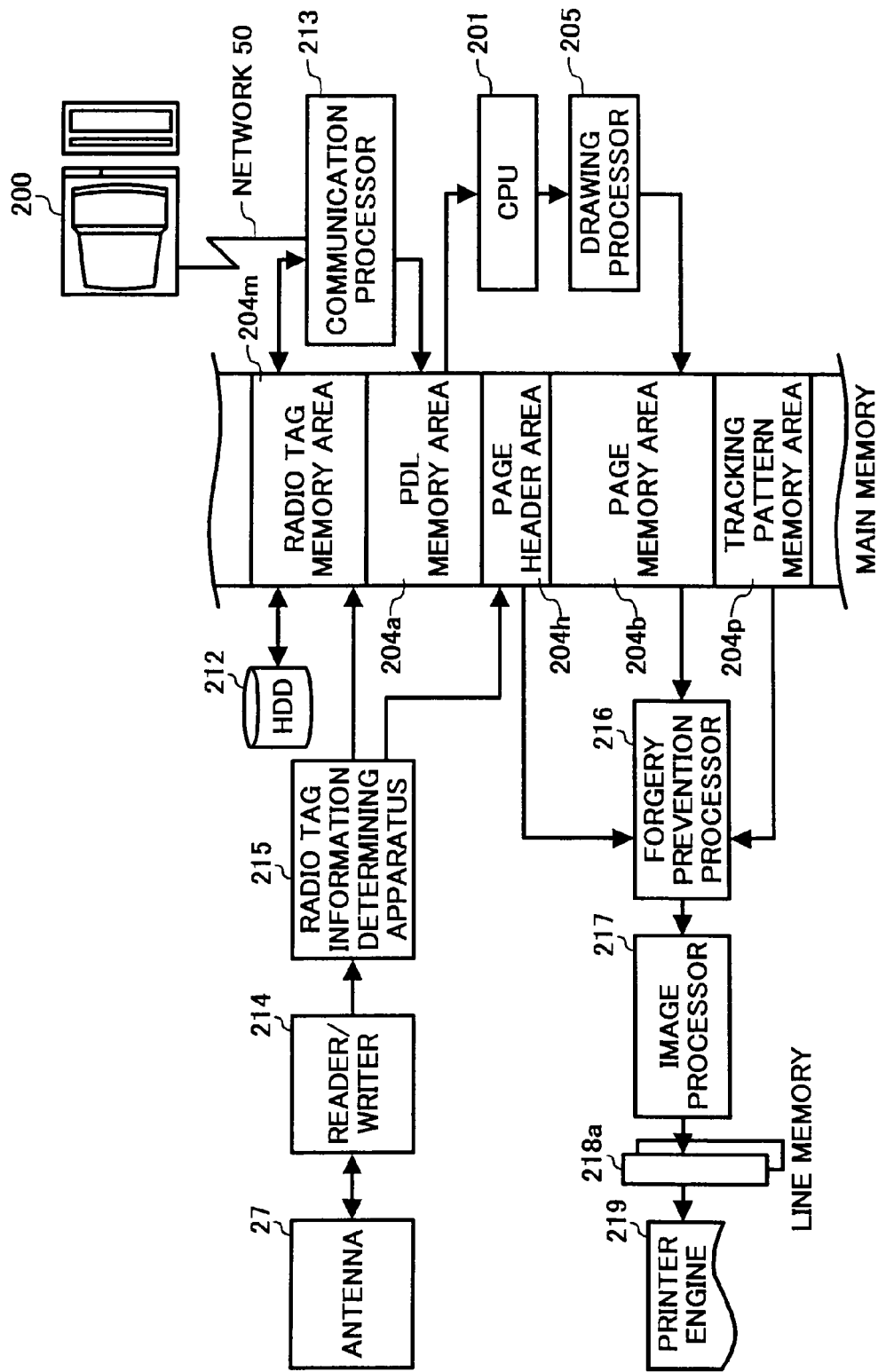
FIG. 6 is a diagram for explaining the concept of processing performed by the image forming apparatus.
Figure 9:
FIG. 9 is an example of radio tag information according to the first embodiment.

FIG. 6 is a diagram for explaining the concept of processing performed by the image forming apparatus according to the first embodiment. The antenna 27 transmits the radio wave to the radio tag and receives the radio wave from the radio tag, synchronized with the transport timing. The reader/writer 214 transmits a request to the radio tag to the antenna 27 or receives a response from the radio tag. The specific configuration and operation will be explained later. The radio tag information determining apparatus 215 determines the information of the radio tag transmitted from the reader/writer 214 and writes the information in the radio tag memory area 204m of the memory. An example of the radio tag information is shown in FIG. 9. The PC 200 generates the PDL to be printed out, and transfers the PDL to the communication processor 213 via the network 50. The communication processor 213 receives the PDL from the PC 200 and writes the PDL in the PDL memory area 204a of the main memory 204. The CPU 201 reads the PDL in the PDL memory area 204a of the main memory 204 to analyze the PDL, and transfers a drawing command to the drawing processor 205. The drawing processor 205 analyzes the drawing command from the CPU 201 and draws in the page memory area 204b. The main memory 204 stores the PDL from the PC 200, page image data, the radio tag information read by the antenna 27, and the like. The HDD 212 records the radio tag information from the radio tag information determining apparatus 215 therein. The forgery prevention processor 216 reads a page header in the page header area 204h to determine whether the forgery prevention processing is to be performed, and when the forgery prevention processing is to be performed, performs the forgery prevention processing by reading the page image data and the tracking pattern. The image processor 217 performs the color conversion processing, tone processing, and the like, and transfers the processed image data to a line memory 218a. The line memory 218a temporarily stores the image-processed data.

The radio tag information shown in FIG. 9 indicates an example of a cash voucher. In this case, access information such as time, type, manufacturer, terms of validity, and registration number is written in the radio tag memory area 204m.

Figure 7:
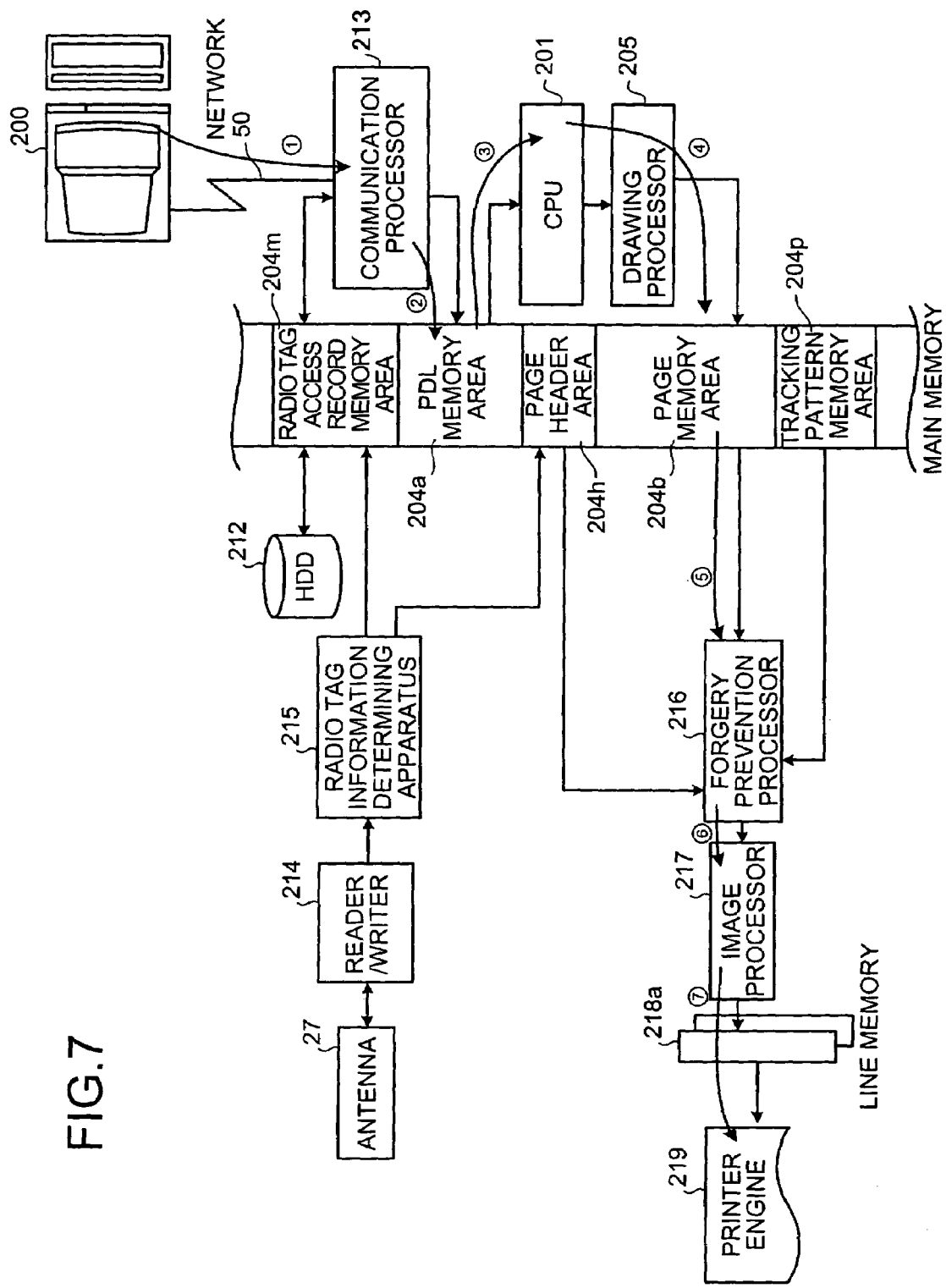
FIG. 7 is a diagram for explaining the flow of normal print processing.

FIG. 7 is a diagram for explaining the flow of normal print processing. The flow of the print processing is shown by arrows with numbers. The PC 200 generates the PDL to be printed and transmits it to the printer via the network 50. The CPU 201 analyzes the PDL and transmits a drawing command to the drawing processor 205. The drawing processor performs drawing in the page memory area 204b. The forgery prevention processor 216 reads the page image data and transfers the page image data to the image processor 217. The image processor 217 reads the page image data, performs image processing, and transfers the processed page image data to the printer engine 219.

Figure 8:
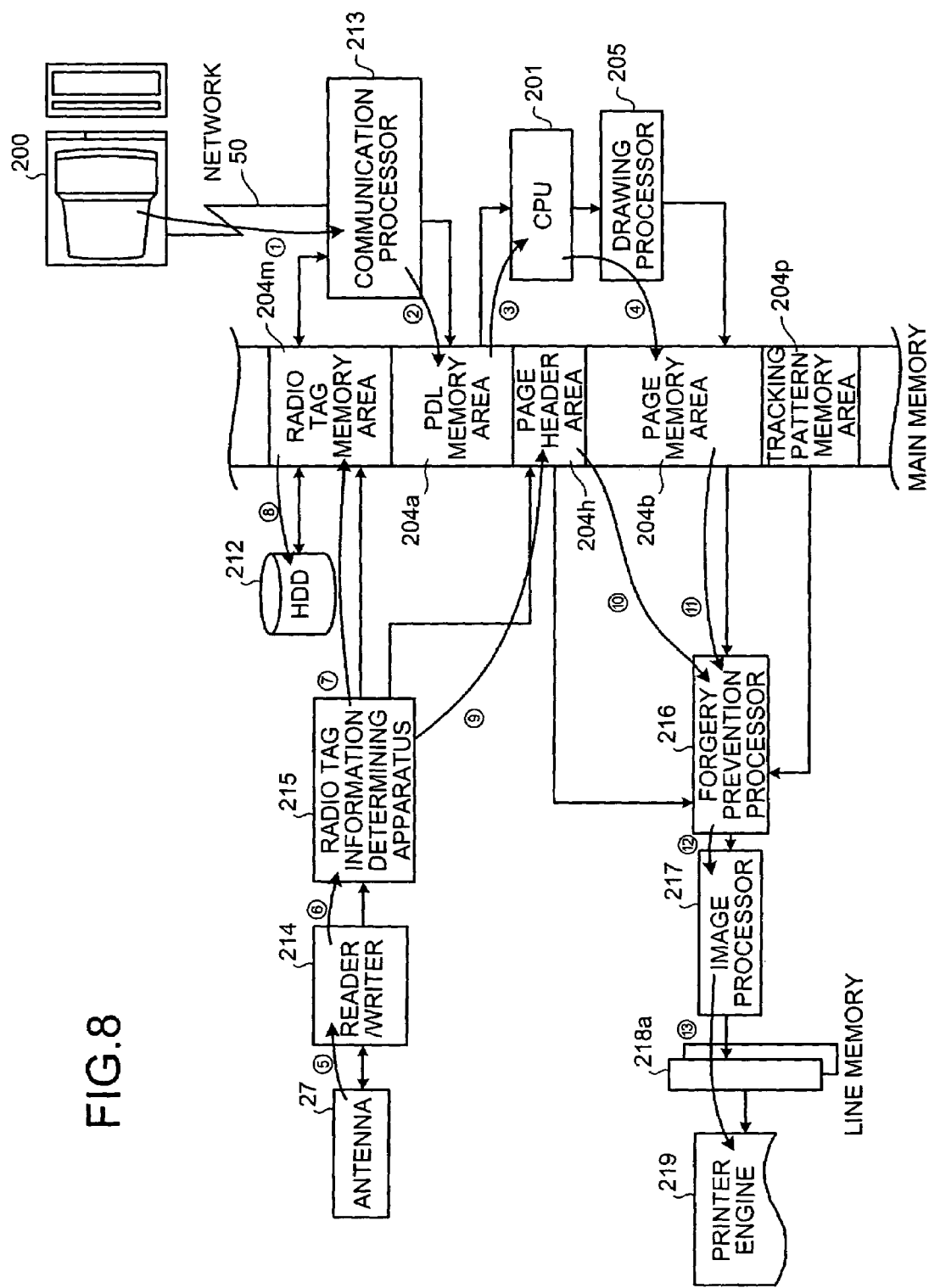
FIG. 8 is a diagram for explaining the flow of print processing with forgery prevention.

FIG. 8 is a diagram for explaining the flow of print processing with forgery prevention. The flow of the print processing is shown by arrows with numbers. The PC 200 generates the PDL to be printed and transmits it to the printer via the network 50. The CPU 201 analyzes the PDL and transmits a drawing command to the drawing processor 205. The drawing processor 205 performs drawing in the page memory area 204*b*. The antenna 27 searches whether there is a radio tag at the time of transport, and when there is the radio tag, the antenna 27 notifies the radio tag information determining apparatus 215 of the presence of the radio tag. The radio tag information determining apparatus 215 writes the radio tag information in the radio tag memory area 204*m*, and when the radio tag is to be forgery-prevented, writes in the page header area 204*h* that forgery prevention is necessary. The forgery prevention processor 216 reads the page header and determines whether the forgery prevention is necessary. When the forgery prevention is necessary, the forgery prevention processor 216 reads the page image data and the tracking pattern, to perform the forgery prevention processing, and transfers the page image data and the tracking data to the image processor 217. The image processor 217 reads the page image data, performs image processing, and transfers the processed page image data to the printer engine 219.

Figure 10:
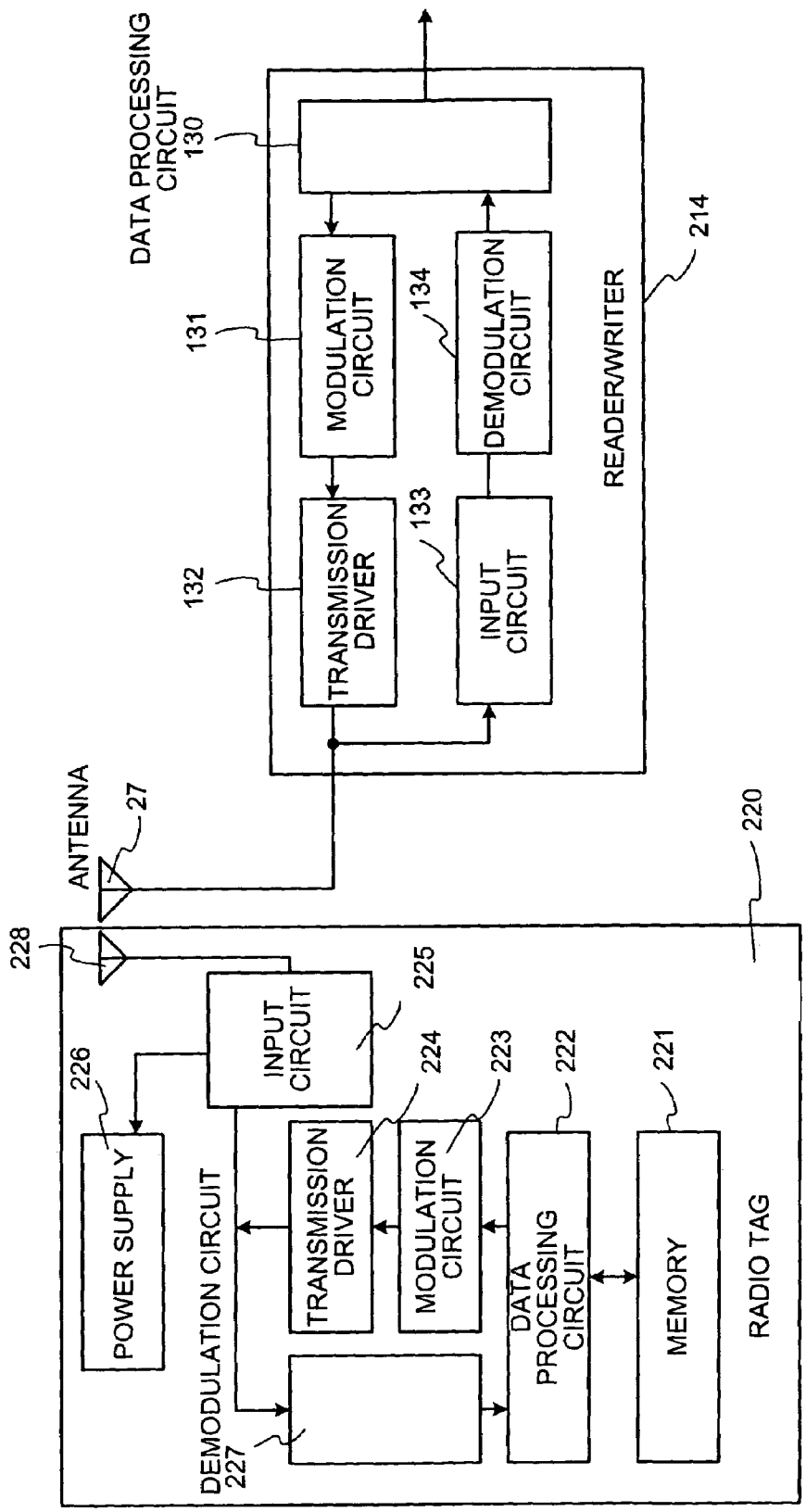
FIG. 10 is a block diagram of a radio tag and a reader/writer.

FIG. 10 is a block diagram of the radio tag and the reader/writer. A radio tag 220 includes a memory 221, a data processing circuit 222, a modulation circuit 223, a transmission driver 224, an input circuit 225, a power supply 226, a demodulation circuit 227, and an antenna 228.

The memory 221 stores the serial number of the radio tag, the content of the radio tag, and the like. The data processing circuit 222 performs various kinds of data processing. The modulation circuit 223 performs modulation with respect to the transmitted data. The transmission driver 224 performs transmission. The input circuit 225 controls the transfer antenna. The power supply 226 generates a stable DC voltage by rectifying and smoothing the received radio wave, and supplies the DC voltage to the respective circuits as an operating voltage. The demodulation circuit 227 performs demodulation with respect to a received signal.

The reader/writer 214 includes a data processing circuit 130, a modulation circuit 131, a transmission driver 132, an input circuit 133, and a demodulation circuit 134.

The data processing circuit 130 performs various kinds of data processing, and transfers the received information to the radio tag information determining apparatus 215. The modulation circuit 131 performs modulation with respect to the transmitted data. The transmission driver 132 performs transmission. The input circuit 133 controls the transfer antenna. The demodulation circuit 134 performs demodulation with respect to the received signal.

Figure 11:
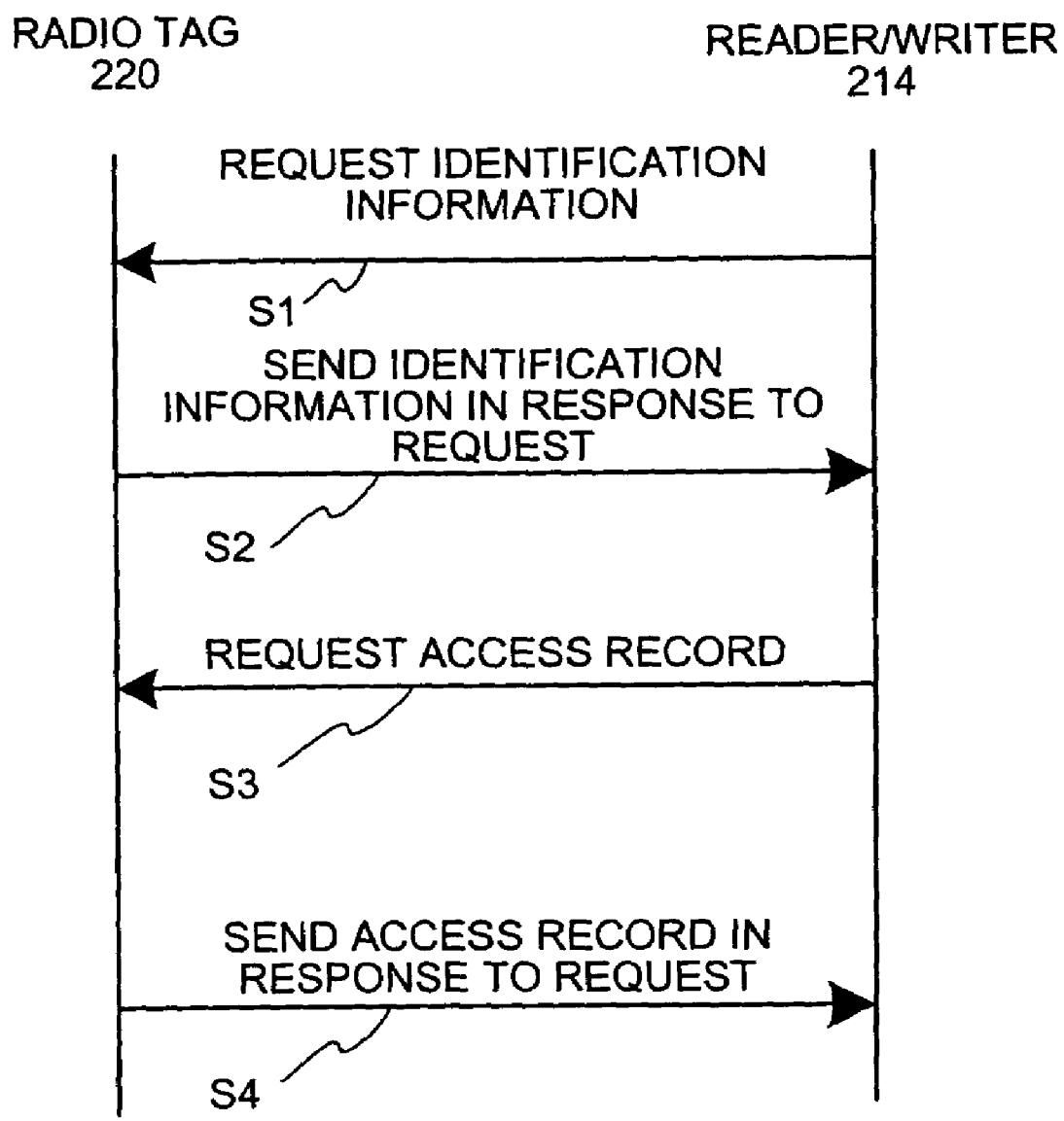
FIG. 11 is an example of the communication operation between the radio tag and the reader/writer.

FIG. 11 is an example of the communication operation between the radio tag 220 and the reader/writer 214. The reader/writer 214 requests identification information to the radio tag 220 (step S1). The radio tag 220 sends the identification information to the reader/writer 214 in response to the request (step S2). Subsequently, the reader/writer 214 requests the access record to the radio tag 220 (step S3). The radio tag 220 responds the access record (see FIG. 9) to the reader/writer 214 (step S4).

Figure 12:
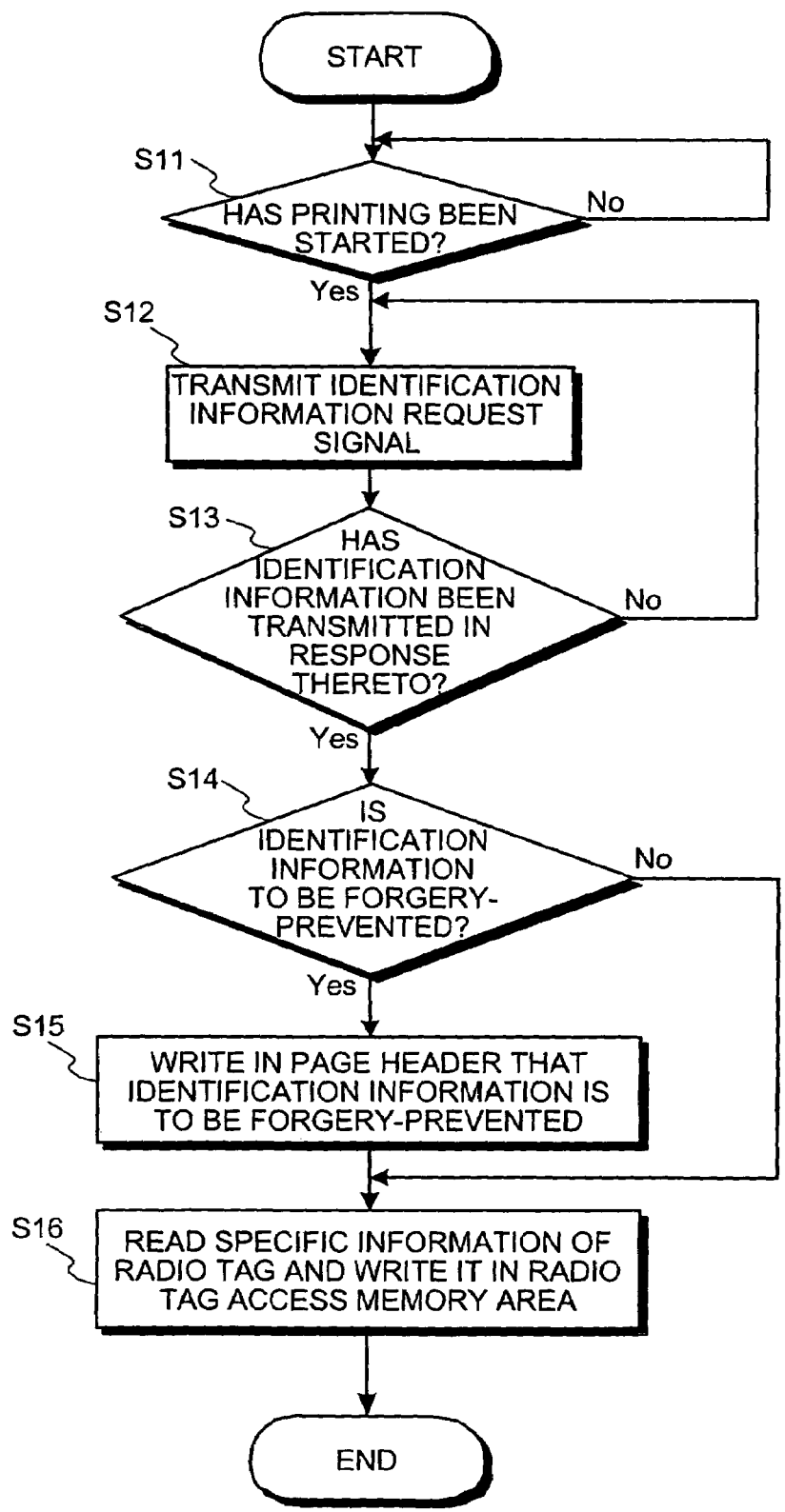
FIG. 12 is a flowchart of communication processing between the radio tag and the image forming apparatus according to the first embodiment.

FIG. 12 is a flowchart of communication processing between the radio tag and the image forming apparatus according to the first embodiment. It is determined whether printing has been started (step S11), and when it is determined that printing has been started, an identification information request signal is transmitted (step S12), and it is determined whether the identification information is transmitted in response thereto (step S13). It is determined here whether the identification information is to be forgery-prevented (step S14), and when the identification information is to be forgery-prevented, it is written in the page header that the identification information is to be forgery-prevented (step S15), and specific information of the radio tag is read and written in the radio tag memory area 204*m* (step S16).

Figure 13:
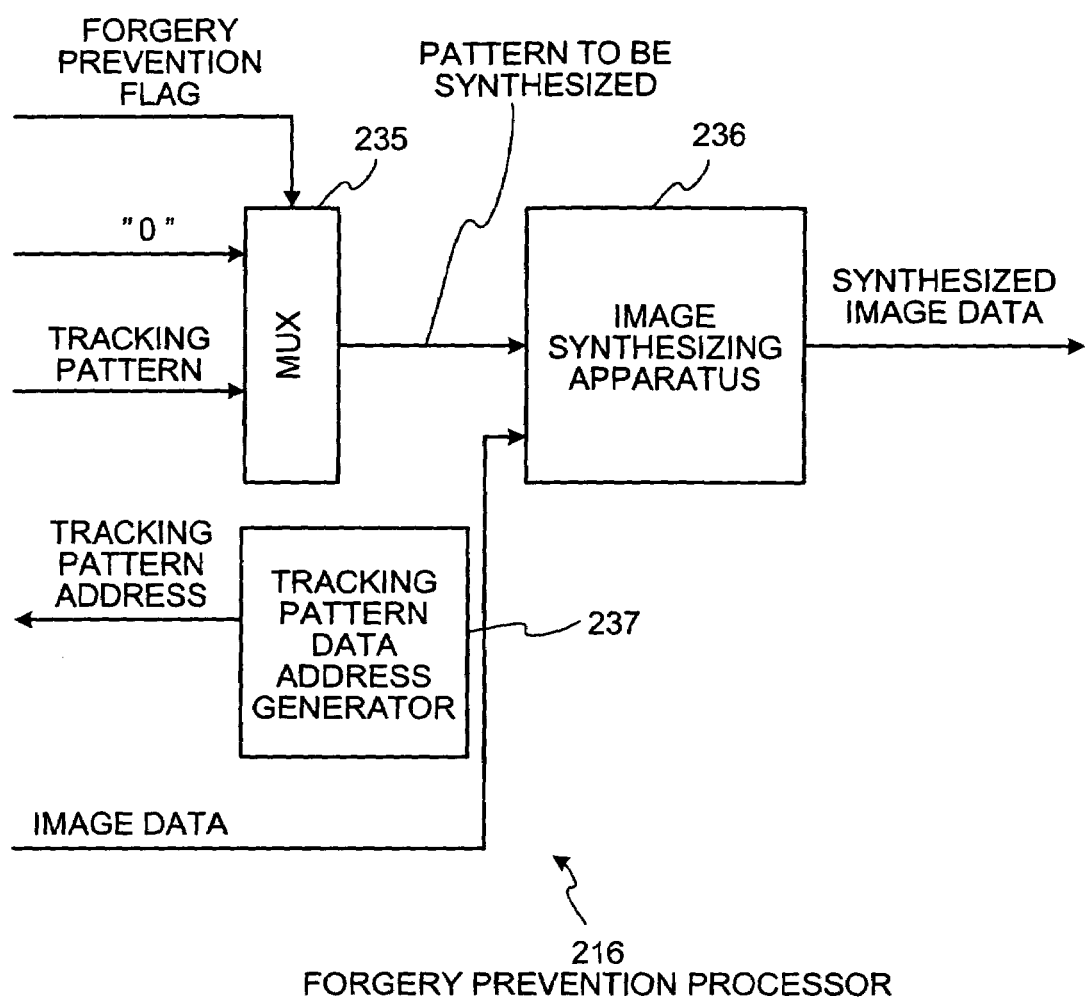
FIG. 13 is a block diagram of a forgery prevention processor shown in FIG. 4.

FIG. 13 is a block diagram of the forgery prevention processor 216 shown in FIG. 4. The forgery prevention processor 216 includes a multiplexer (MUX) 235, an image synthesizing apparatus 236, and a tracking pattern data address generator 237.

When a forgery prevention flag is "1" (indicating that the information is to be forgery-prevented), the MUX 235 transfers the tracking pattern to the image synthesizing apparatus 236, and when the forgery prevention flag is "0" (indicating that the information is not to be forgery-prevented), the MUX 235 transfers a "0" pattern to the image synthesizing apparatus 236. The image synthesizing apparatus 236 receives a decoded image and the pattern to be synthesized with the decoded image from the MUX 235 to perform image synthesis. The tracking pattern data address generator 237 generates an address of the tracking pattern memory area 204*p* in the main memory 204.

Figure 14:
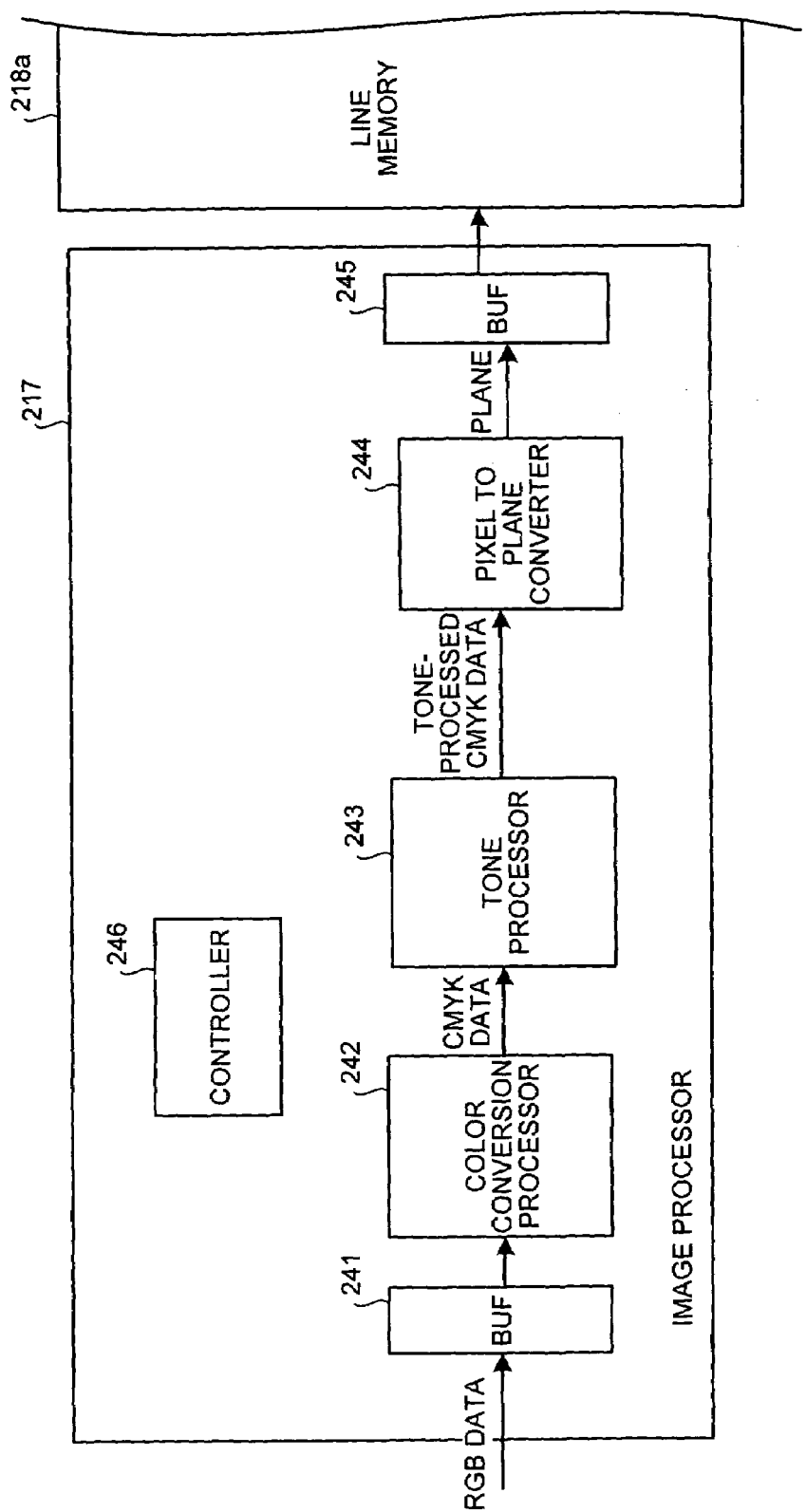
FIG. 14 is a block diagram of an image processor shown in FIG. 4.

FIG. 14 is a block diagram of the image processor 217 shown in FIG. 4. The image processor 217 includes a buffer (BUF) 241, a color conversion processor 242, a tone processor 243, a PIXEL To PLANE converter 244, a buffer (BUF) 245, and a controller 246.

The BUF 241 temporarily stores the image data from the forgery prevention processor 216. The color conversion processor 242 color-converts the image data stored in the BUF 241 to cyan/magenta/yellow/black (CMYK) data. The tone processor 243 performs tone processing with respect to the CMYK data color-converted by the color conversion processor 242. The PIXEL To PLANE converter 244 rearranges the tone-processed CMYK data to a word size of the memory for each plane of C, M, Y, and K. The BUF 245 temporarily stores the data from the PIXEL To PLANE converter 244.

Figure 15:
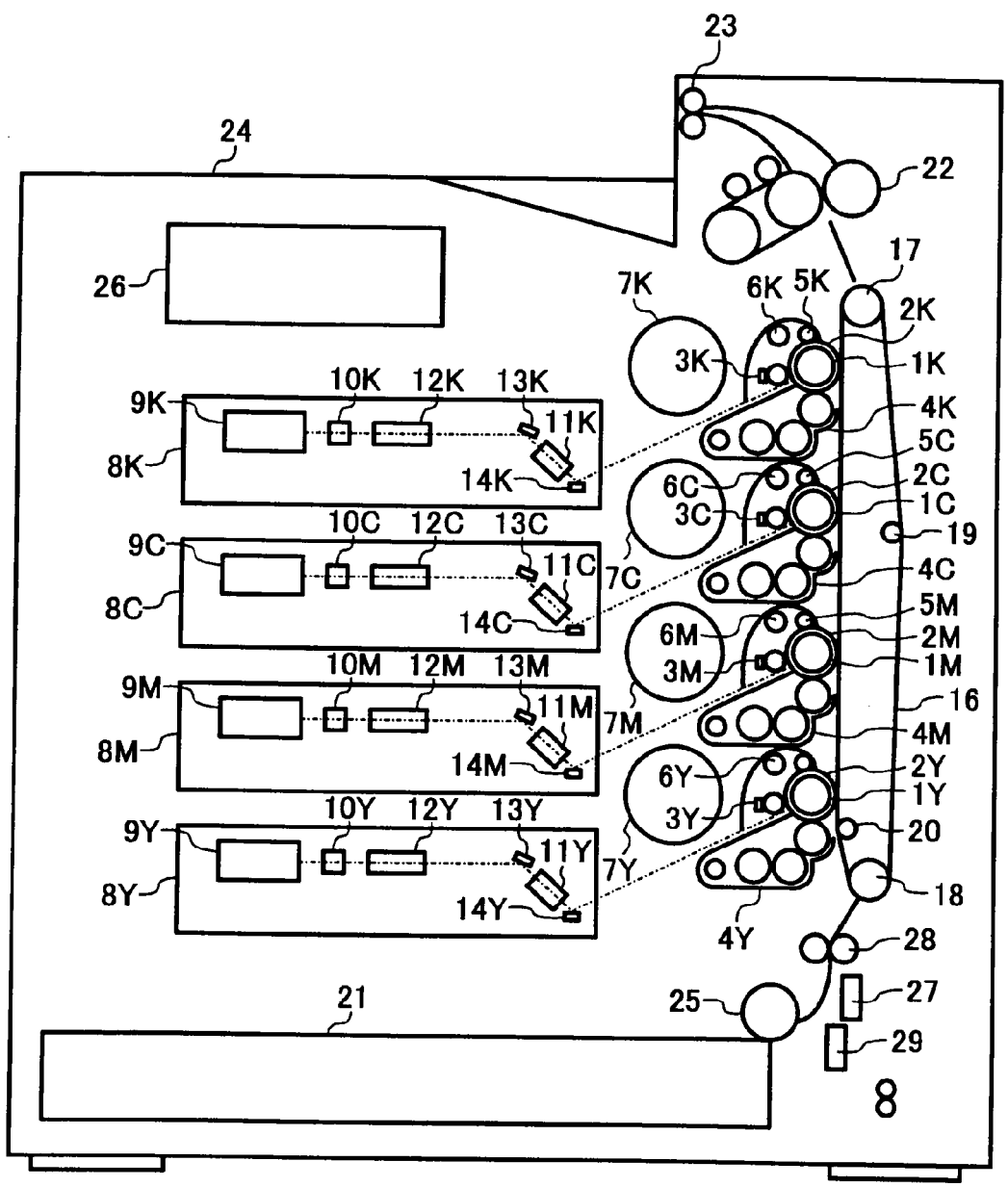
FIG. 15 is another diagram of an image forming apparatus according to the first embodiment.

FIG. 15 depicts another configuration of the image forming apparatus according to the first embodiment, wherein a dummy antenna 29 is added to the configuration in FIG. 1. Like reference signs refer to like functional elements in FIG. 1 and explanation thereof is omitted.

Figure 18:
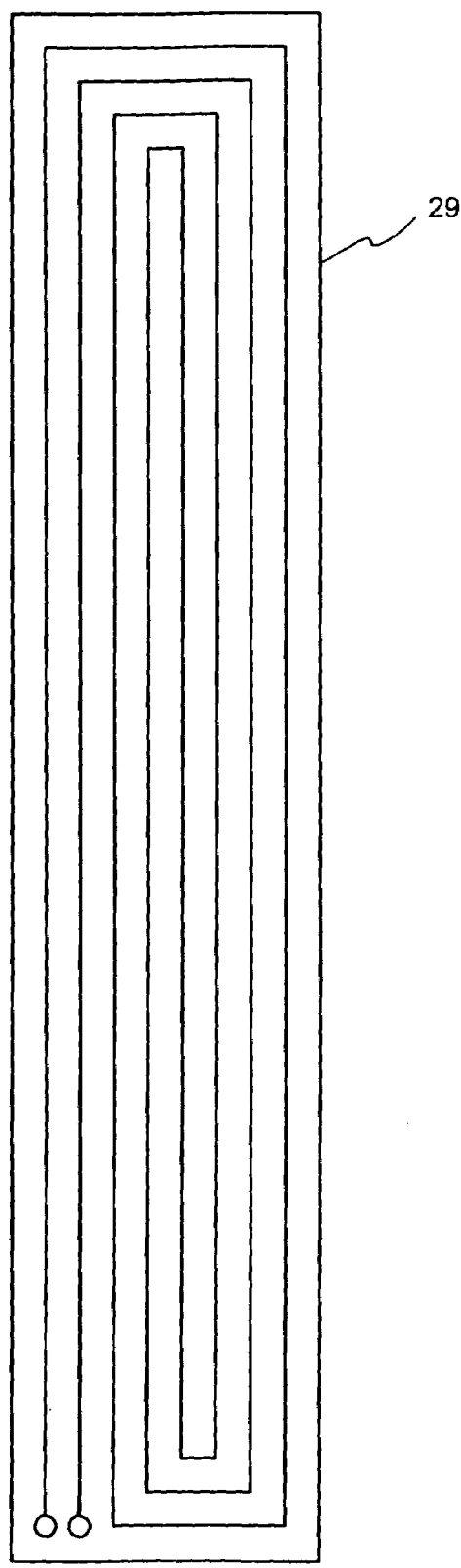
FIG. 18 is a diagram of a dummy antenna shown in FIG. 15.

At the time of transport, the antenna 27 sequentially searches the carried recording media and repeats processing of transmission of radio wave to the radio tag and reception of the radio wave, to determine whether there is a radio tag. The dummy antenna 29 is formed so as to send dummy radio wave for determining whether the antenna 27 normally operates before printing, and determine whether reception by the antenna 27 is possible. A configuration example of the dummy antenna 29 is shown in FIG. 18.

Figure 16:
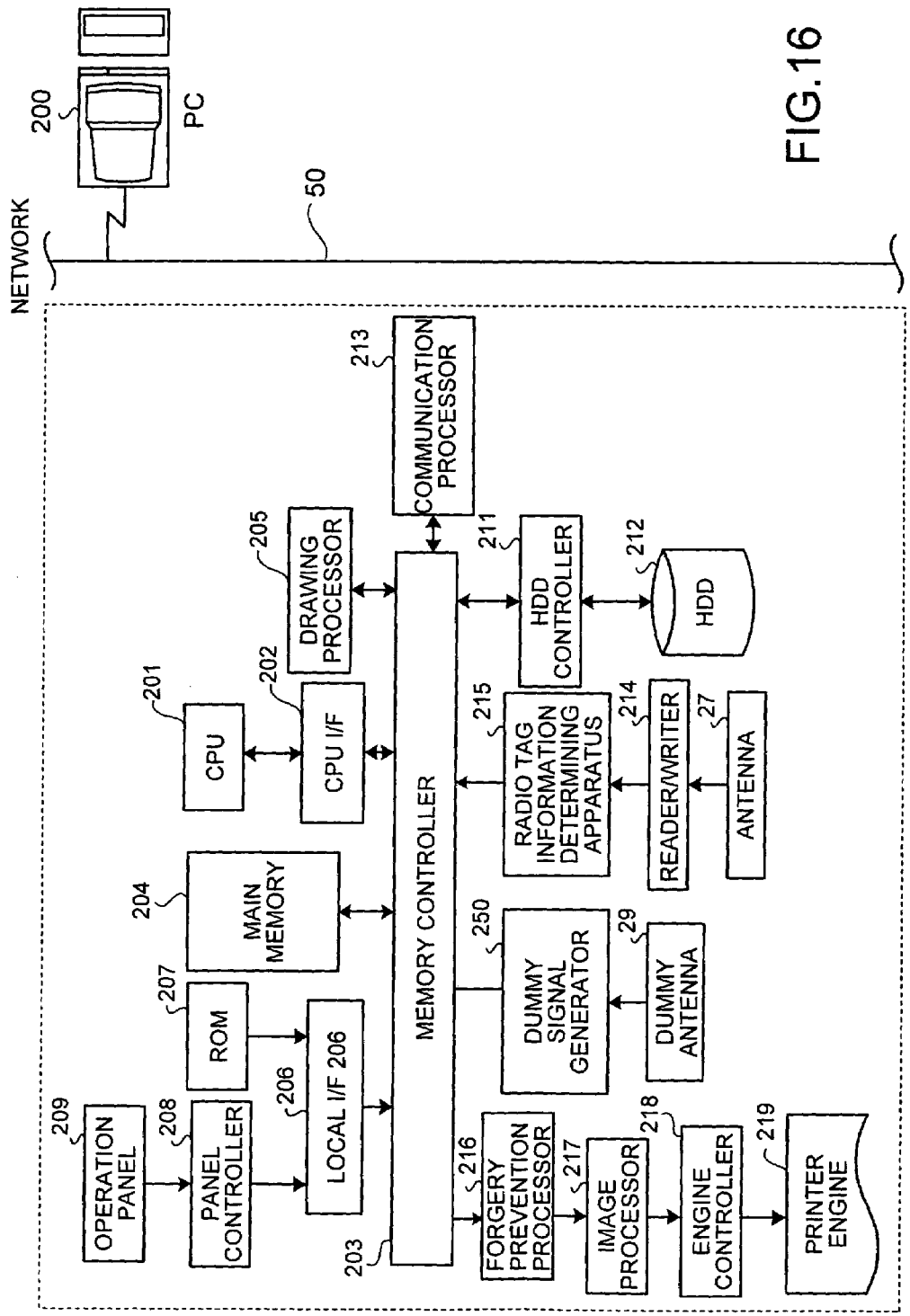
FIG. 16 is another block diagram of the electrical equipment controller shown in FIG. 15.

The configuration of the electrical equipment controller in the image forming apparatus is shown in FIG. 16. A dummy signal generator 250 that generates a dummy signal for the dummy antenna 29 is added to the configuration in FIG. 4. That is, the dummy signal generator 250 generates a dummy signal for determining whether the antenna 27 normally operates at the time of starting printing. The dummy antenna 29 sends a dummy signal generated by the dummy signal generator 250 as the radio wave and allows the antenna 27 to receive the dummy signal.

Figure 17:
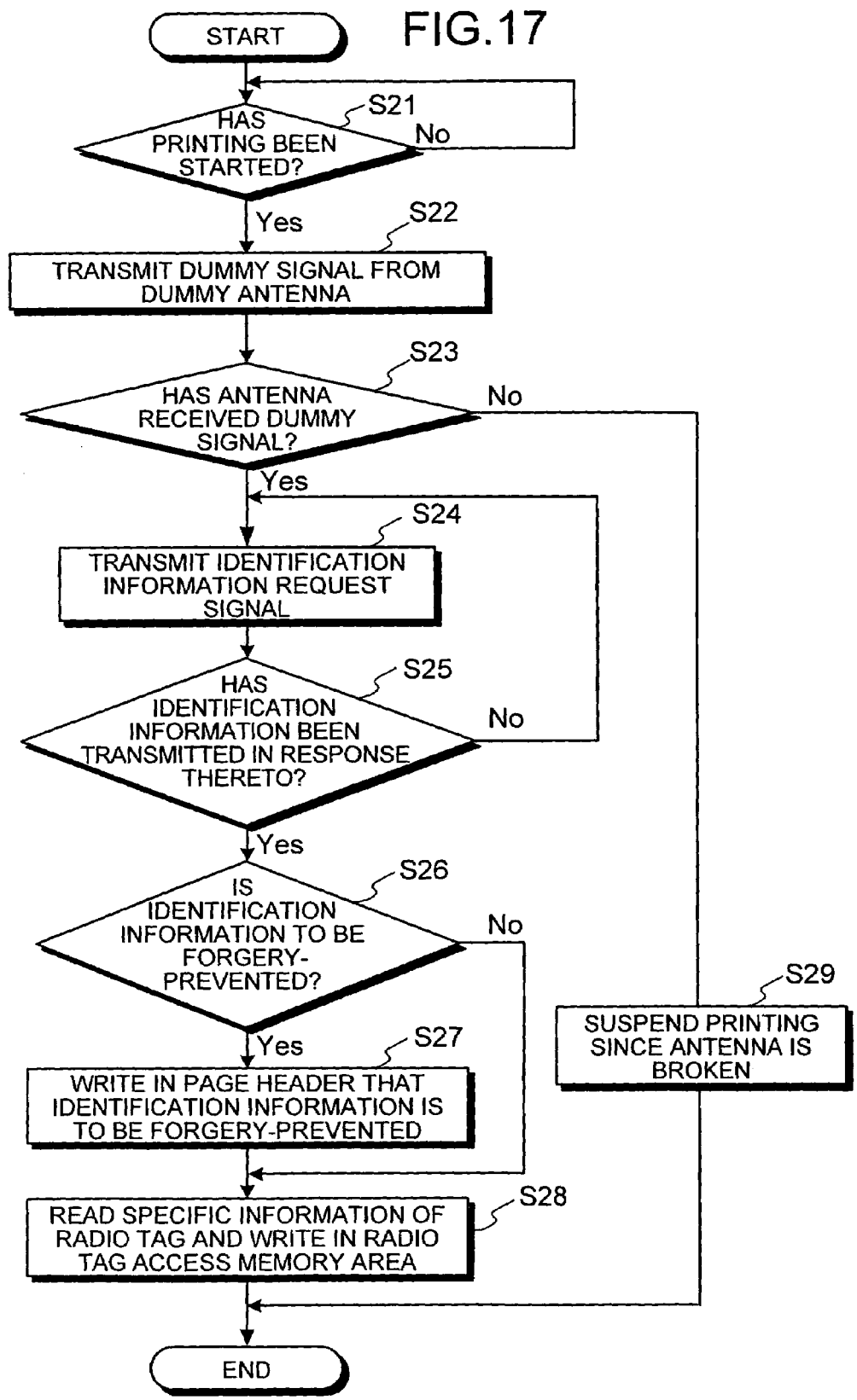
FIG. 17 is another flowchart of communication processing between the radio tag and the image forming apparatus according to the configuration shown in FIG. 15.

FIG. 17 is another flowchart of the communication processing between the radio tag and the image forming apparatus according to the configuration shown in FIG. 15. It is determined whether printing has been started (step S21), and when it is determined that printing has been started, the dummy antenna 29 transmits a dummy signal (step S22). The antenna 27 determines whether the dummy signal has been received (step S23), and upon reception of the dummy signal, transmits an identification information request signal (step S24), and determines whether a response to the identification information request has been sent (step S25). The antenna 27 determines whether the identification information is to be forgery-prevented (step S26), and when the identification information is to be forgery-prevented, adds that the identification information is to be forgery-prevented to the page header (step S27), reads the specific information of the radio tag, and writes the information in the radio tag memory area 204m (step S28). On the other hand, when the antenna 27 has not received the dummy signal, though the dummy signal has been transmitted, printing is suspended, assuming that the antenna 27 is broken (step S29).

According to the first embodiment, the antenna 27 is arranged in the carrier unit, the communication is performed with the radio tag on the carried recording medium, concurrently with printing, so that the image processing at the time of printing can be changed. Furthermore, the communication with the radio tag on the carried sheet is performed by the antenna, concurrently with printing, to recognize the type of the radio tag, and forgery prevention processing is performed when the radio tag is to be forgery-prevented, thereby preventing forgery. Furthermore, the carrier unit has the dummy antenna 29 arranged therein, dummy radio wave is transmitted at the time of first printing, and by determining whether the system for detecting the radio tag on the carried sheet normally operates, a forgery prevention function of the equipment is normally operated.

In other words, the antenna 27 is arranged in a carried portion of a recording medium, to determine whether a radio tag is attached on the recording medium to be printed. When there is the radio tag, it is determined whether the radio tag is to be forgery-prevented, and when the radio tag is to be forgery-prevented, the antenna 27 adds an instruction to execute forgery prevention to the page header, to perform forgery prevention processing, such as recording the type of the radio tag, time, and the like in the access record, and at the time of printing, the tracking pattern is inserted and printed. Furthermore, the antenna 27 can be broken and forged. Therefore, the dummy antenna 29 is also used, to transmit a dummy signal at the time of starting printing, to determine whether the antenna 27 can receive the signal, and if the antenna 27 cannot receive the signal, it is determined that the antenna 27 is broken, and hence, printing is suspended, thereby preventing forgery.

A forgery prevention with respect to cash vouchers has been explained in the first embodiment. However, the present invention is applicable to a system for checking the radio frequency identification (RFID) on a recording medium, in a transport route (a route for performing transport of the recording medium up to image transfer) of the recording medium between the carrier unit to the transfer belt (transfer unit).

According to a second embodiment of the present invention, an accounting system can be built, in which an antenna is arranged in a traveling unit of a scanner, to perform communication with the radio tag by the antenna concurrently with image read, to recognize the type of the radio tag, copied content and number of copies are recorded, added up, and informed to the company having the copyright, thereby enabling accounting. Furthermore, an accounting system that enables copy processing with good image quality and accounting can be built, by communicating with the radio tag on a publication by the antenna, to recognize the type of the radio tag, the copied content, and the publisher, informing the accounting system in the publisher of the page to be printed and the number of copies, and reading the PDL or the PDF and printing this. The system is described in more detail below.

Figure 19:
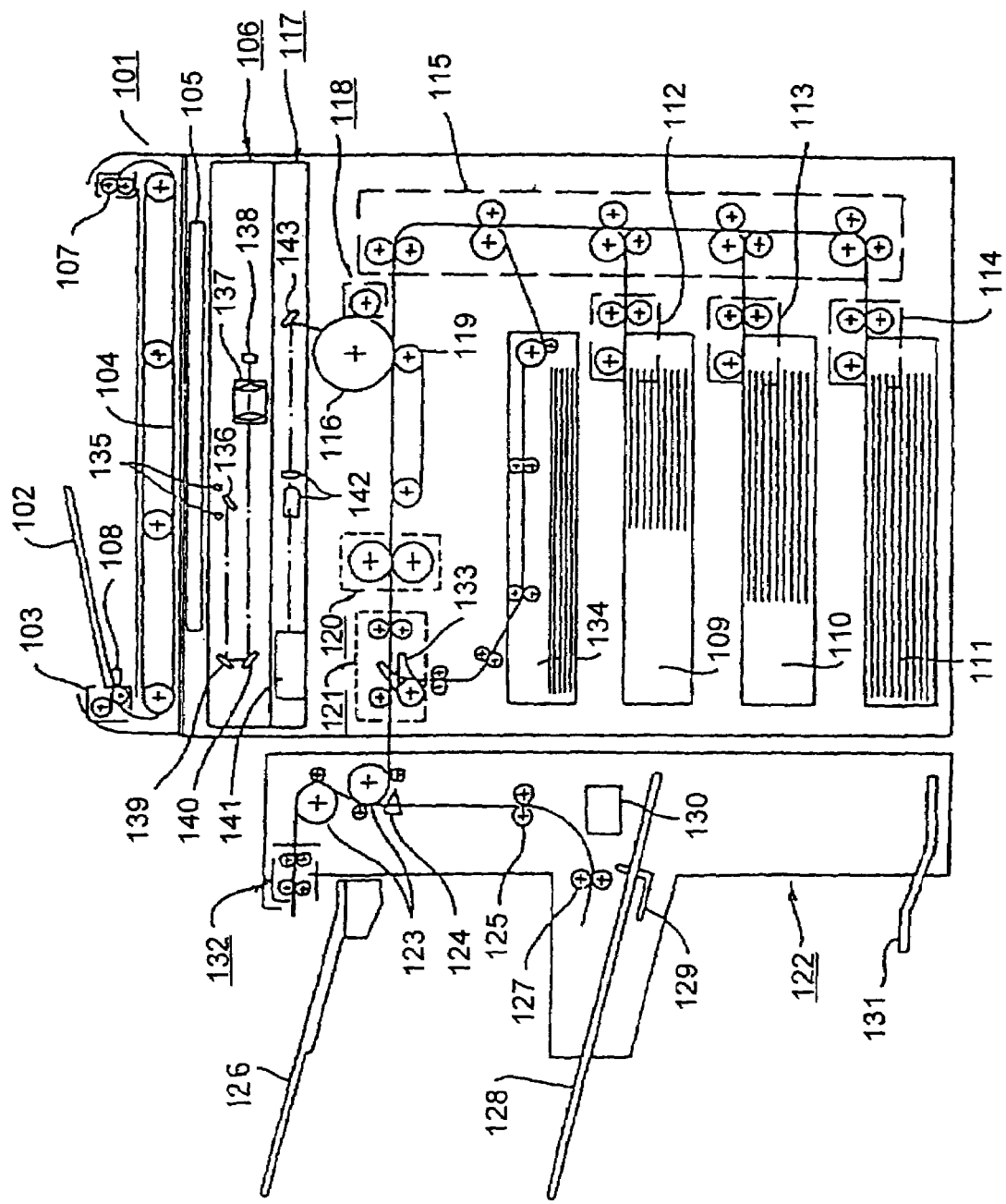
FIG. 19 is a diagram of an image forming apparatus according to a second embodiment of the present invention.

FIG. 19 is a diagram of an image forming apparatus according to a second embodiment of the present invention. The image forming apparatus is a so-called multi function type, which has a copy function and other functions, for example, a printer function, and a facsimile function, and is capable of selecting the copy function, the printer function, and the facsimile function by sequentially switching the functions by an application change key in an operation unit. That is, the image forming apparatus can select a copy mode at the time of selecting the copy function, a print mode at the time of selecting the printer function, and a facsimile mode at the time of selecting the facsimile function.

In the copy mode, the image forming apparatus operates as described below. In the automatic document feeder (hereinafter, simply "ADF") 101, the bottom document of the documents set on an original tray 102, with the image side being upward, is fed to a predetermined position on a contact glass 105 by a feed roller pair 103 and a feed belt 104, when a start key on the operation unit is pressed. The ADF 101 has a counting function for counting up the number of documents every time one document is fed. The document on the contact glass 105 is ejected onto a paper ejection tray by the feed belt 104 and a discharge roller pair 107 after the image information is read by a scanner 106.

When a document set detector 108 detects that there is the next document on the original tray 102, the bottom document on the original tray 102 is fed to the predetermined position on the contact glass 105 by the feed roller pair 103 and the feed belt 104. The document on the contact glass 105 is ejected onto the paper ejection tray by the feed belt 104 and the discharge roller pair 107 after the image information is read by the scanner 106. The feed roller pair 103, the feed belt 104, and the discharge roller pair 107 are driven by a carrier motor (not shown).

A first carrier unit 112, a second carrier unit 113, and a third carrier unit 114 carry the recording medium as a transfer material respectively loaded on a first tray 109, a second tray 110, and a third tray 111, when being selected by the operation unit (not shown) or by automatic selection, and the recording medium is carried to the position abutting against a photoconductor drum 116 as an image carrier by a perpendicular carrier unit 115. The photoconductor drum 116 is rotated by a main motor (not shown).

The image data read from the document by the scanner 106 is converted to optical information by a writing unit 117 via an image processor (not shown), and the photoconductor drum 116 is uniformly charged by a charger (not shown) and exposed to the optical information from the writing unit 117, thereby to form an electrostatic latent image. The electrostatic latent image on the photoconductor drum 116 is developed by a development apparatus 118 to form a toner image.

A carrier belt 119 also serves as a sheet carrier unit and a transfer unit, a transfer bias is applied thereto from a power source, and the toner image on the photoconductor drum 116 is transferred onto the recording medium, while the carrier belt 119 carries the recording medium carried from the perpendicular carrier unit 115, at the same speed as that of the photoconductor drum 116. The toner image on the recording medium is fixed by a fixing apparatus 120 and the recording medium is ejected onto the paper ejection tray by a paper ejection unit 121. The photoconductor drum 116 is cleaned by a cleaning device (not shown) after the toner image is transferred to the recording medium. The photoconductor drum 116, the charger, the writing unit 117, the development apparatus 118, and the transfer unit form an image forming unit that forms an image on the recording medium based on the image data.

The above operation is for copying an image on one side of the recording medium. However, when the image is copied on the opposite sides of the recording medium by a two-sided mode, the recording medium carried from any one of the feeding trays 109 to 111, on which an image is formed on the surface thereof, is switched to a two-sided paper transport path 133 side by the paper ejection unit 121, not to the paper ejection tray side, front-back reversed by being switched back by a reversing unit 134, and carried to a two-sided carrier unit.

The recording medium carried to the two-sided carrier unit is carried to the perpendicular carrier unit 115 by the two-sided carrier unit, and carried to the position abutting against the photoconductor drum 116 by the perpendicular carrier unit 115. Furthermore, the toner image formed on the photoconductor drum 116 in the same manner as described above is transferred to the backside of the recording medium, and fixed by the fixing apparatus 120, thereby performing two-sided copying. The two-side copied recording medium is ejected onto the paper election tray by the paper ejection unit 121.

When the recording medium is reversed and ejected, the recording medium switched back by the reversing unit and front-back reversed is not carried to the two-sided carrier unit 134, but ejected onto the paper ejection unit by the paper ejection unit 121 via a reversed paper ejection transport path.

In the print mode, the image data from the outside is input by the writing unit 117, instead of the read and processed image data, and an image is formed on the recording medium by the image forming unit. Furthermore, in the facsimile mode, the image data from the scanner 106 is transmitted to a receiver by the facsimile transfer unit (not shown), and the image data from the receiver is received by the facsimile transfer unit and input to the writing unit 117, thereby forming an image on the recording medium by the image forming unit.

Figure 20:
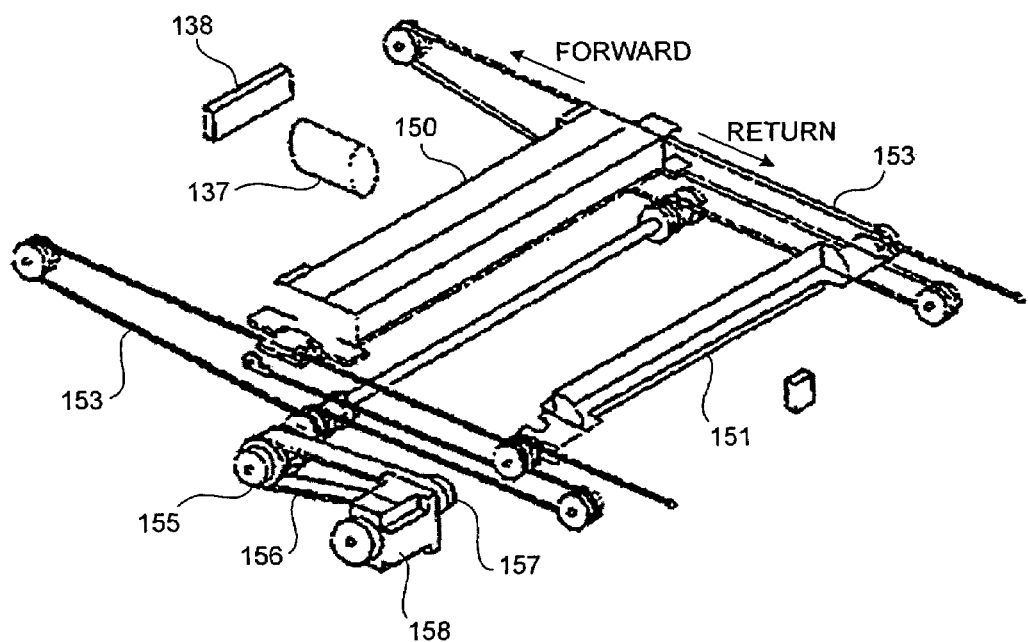
FIG. 20 is a diagram of a scanner shown in FIG. 19.
Figure 21:
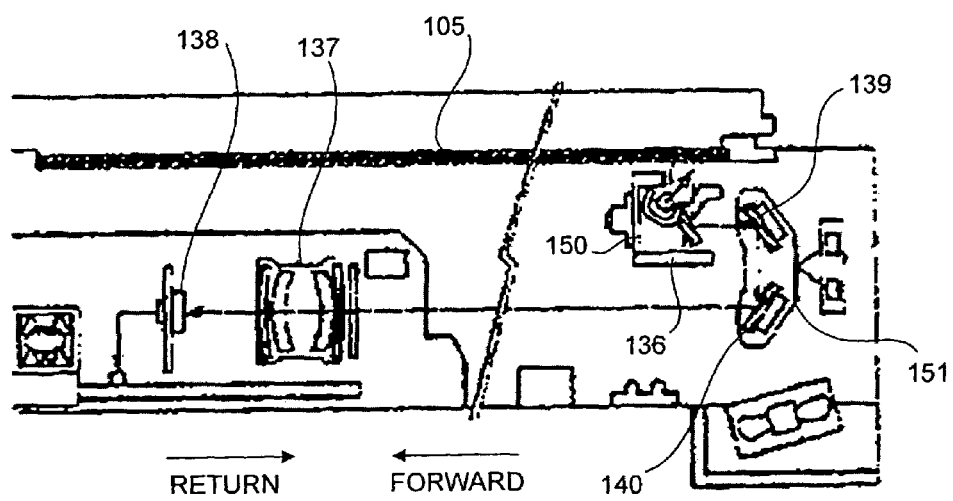
FIG. 21 is a cross section of an optical reading system included in the scanner shown in FIG. 19.

The outline of the scanner 106 shown in FIG. 19 is shown in FIG. 20, and the outline of the optical system of the scanner 106 is mainly shown in FIG. 21. A first carriage 150 and a second carriage 151 are driven in a forward direction and a return direction opposite thereto by two wires 153 laid across symmetrically in a tensioned condition, and the brightness of the document image is converted to an electric signal by a CCD 138, while the document is driven in the forward direction. The wires 153 are wound round a pulley 155 integrally formed with a driving shaft 4 and driven by the rotation thereof. The pulley 155 is coupled to a pulley 157 integrally formed with an output shaft of a stepping motor 158, by a timing belt 156. When the stepping motor 158 normally rotates, the first carriage 150 moves in the forward direction and the second carriage 151 moves in the same direction at half a speed thereof. The part of the first carriage 150 and the second carriage 151 in FIGS. 20 and 21 forms a traveling unit, which irradiates light of a lamp in the horizontal scanning direction, collects the reflected light thereof to the CCD 138 via mirrors 136, 139, and 140, and lens 137, and sequentially moves in the vertical scanning direction.

The antenna 27 (see FIG. 3) is arranged on the first carriage 150. FIG. 5 is an example in which a document is scanned (optically scanned) in the vertical scanning direction by the first carriage 150 (a scanning body).

Figure 23:
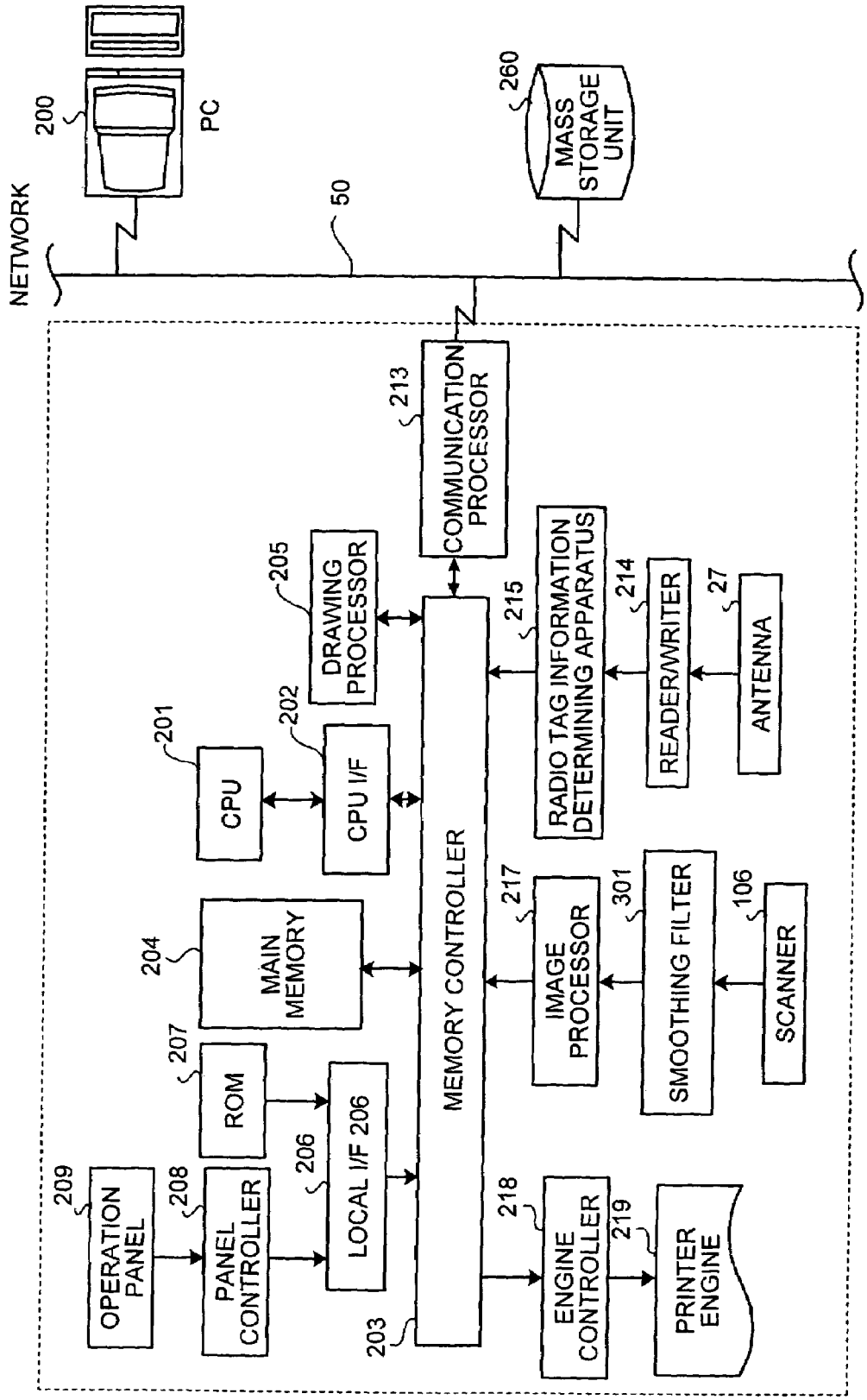
FIG. 23 is a block diagram of an electrical equipment controller according to the second embodiment.

FIG. 23 is a block diagram of an electrical equipment controller according to the second embodiment. The configuration is different from that of the first embodiment shown in FIG. 4 in that a smoothing filter 301 that performs smoothing filter processing with respect to a signal form the scanner 106 and the scanner 106 are arranged in front of the image processor 217. A mass storage unit 260 is connected to the network 50. Since the function and the configuration of other parts are the same as those shown in FIG. 4, like reference signs refer to like parts, and explanation thereof is omitted.

The image is read by the scanner 106 (see FIGS. 19 to 21) and the CCD 138. The smoothing filter 301 performs image processing such as shading correction and MTFγ correction with respect to the image data read from the scanner 106. The image processor 217 performs color conversion processing, tone processing, and the like with respect to the image data from the smoothing filter 301, and writes the processed image data in the page memory area in the main memory 204. The mass storage unit 260 is controlled by an accounting system of the PC 200 and stores the PDL and the like of the publication.

Figure 24:
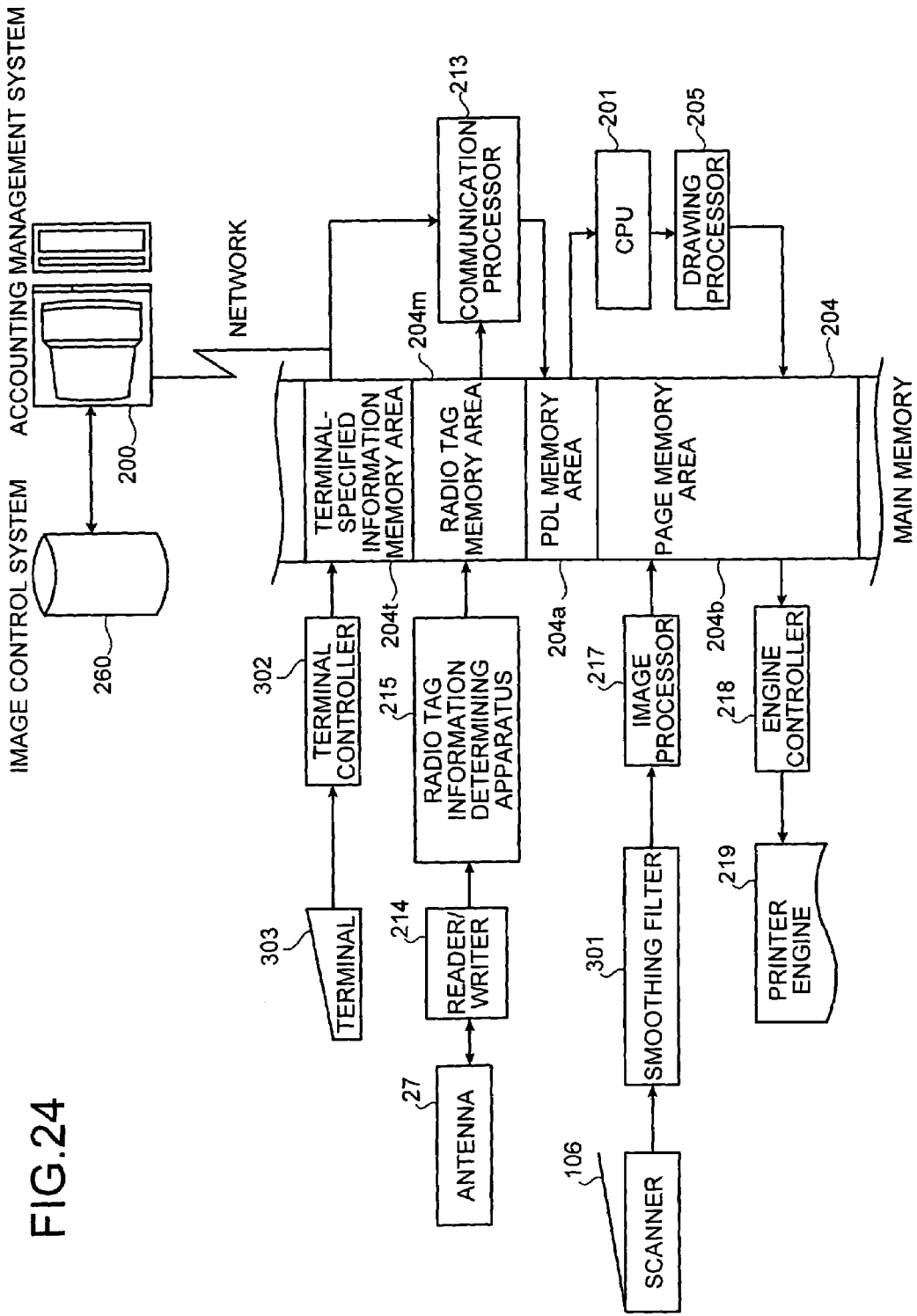
FIG. 24 is a block diagram for explaining the concept of processing performed by the image forming apparatus.

FIG. 24 is a block diagram for explaining the concept of processing performed by the image forming apparatus. The scanner 106 reads multi-level red/green/blue (RGB) image data. The smoothing filter 301 performs image processing such as shading collection, MTFγ correction, and the like with respect to the image data read from the scanner 106 and transfers the processed image data to the image processor 217. The image processor 217 performs color conversion processing, tone processing, and the like with respect to the image data from the smoothing filter 301, and writes the processed image data in the page memory area 204b in the main memory 204. The main memory 204 stores the image-processed images from the scanner 106, the radio tag information read by the PDL of the printer or the antenna, the access information from a terminal 303, and the like. The engine controller 218 transfers the image data from the main memory 204 to the printer engine 219 via the engine controller 218.

Figure 22:
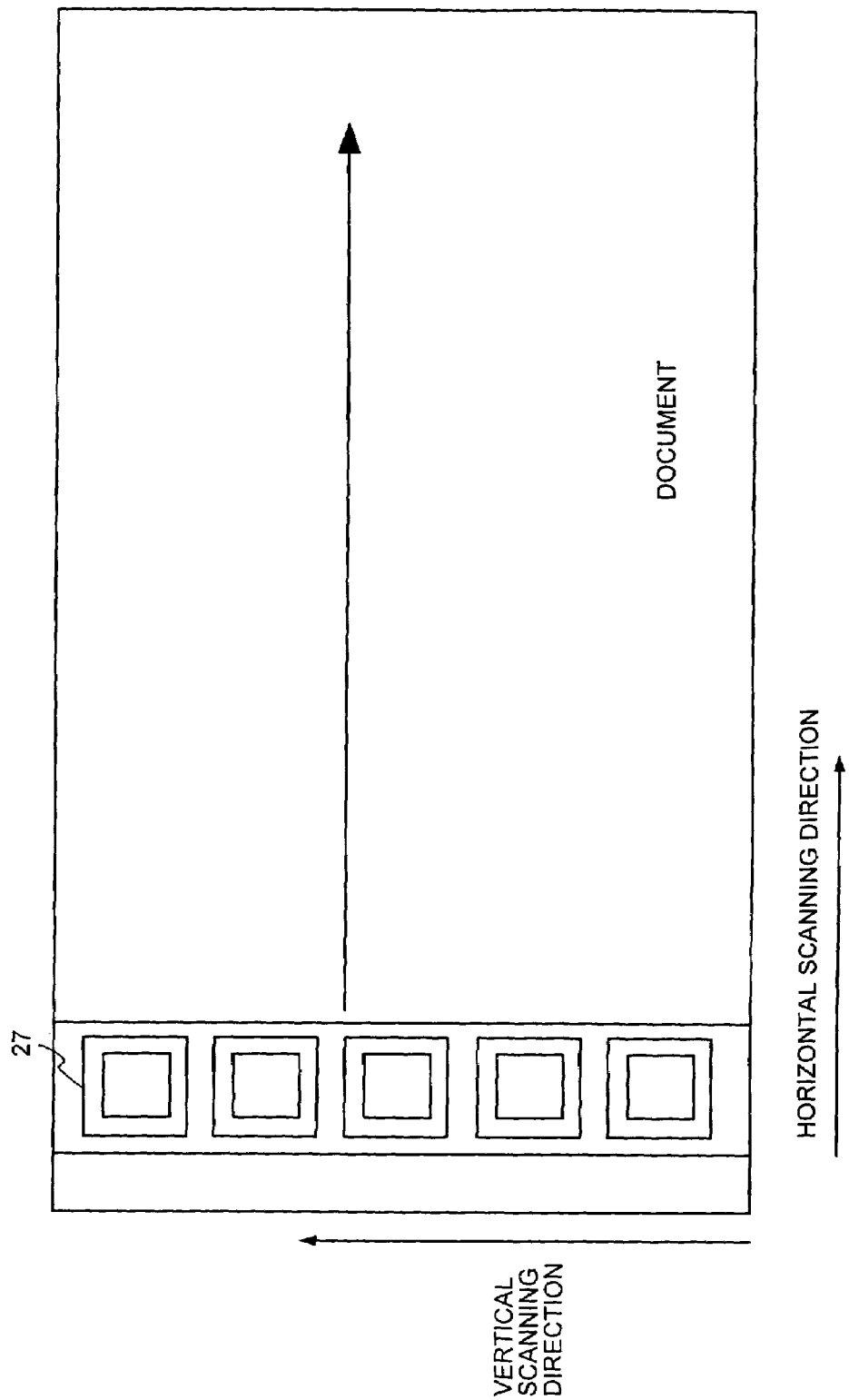
FIG. 22 is a diagram for explaining a position of antennas and a direction of scanning with respect to a document.

The antenna 27 transmits the radio wave to the radio tag and receives the radio wave from the radio tag, while moving in the vertical scanning direction shown in FIG. 22. The reader/writer 214 transmits a request to the radio tag to the antenna 27, and receives a response thereto from the radio tag. The specific configuration is the same as the configuration in FIG. 10. The communication example between the radio tag and the reader/writer is the same as that shown in FIG. 11.

Figure 31:
FIG. 31 is an example of radio tag information according to the second embodiment.

The radio tag information determining apparatus 215 determines the information of the radio tag transmitted from the reader/writer 214 and writes the information in the radio tag memory area 204m in the main memory 204. An example of the radio tag information is shown in FIG. 31. A publication protected by the copyright is explained as an example. The terminal 303 transmits various kinds of instructions such as page designation and number of copies from the user to the copying machine. A terminal controller 302 controls the terminal 303 and writes the transmitted information in a terminal-specified information memory area 204t in the main memory 204. The CPU 201 reads the PDL from the PDL memory area 204a in the main memory 204 and analyzes the PDL, and transfers the PDL to the drawing processor 205. The drawing processor 205 performs the drawing processing into the page memory area 204b in the main memory 204 based on the data received from the CPU 201.

The processing flow in the system will be explained. FIGS. 25 to 30 are block diagrams of the concept of using the system to read and print out the PDL in a certain page of a book by the accounting system of a publication.

Figure 25:
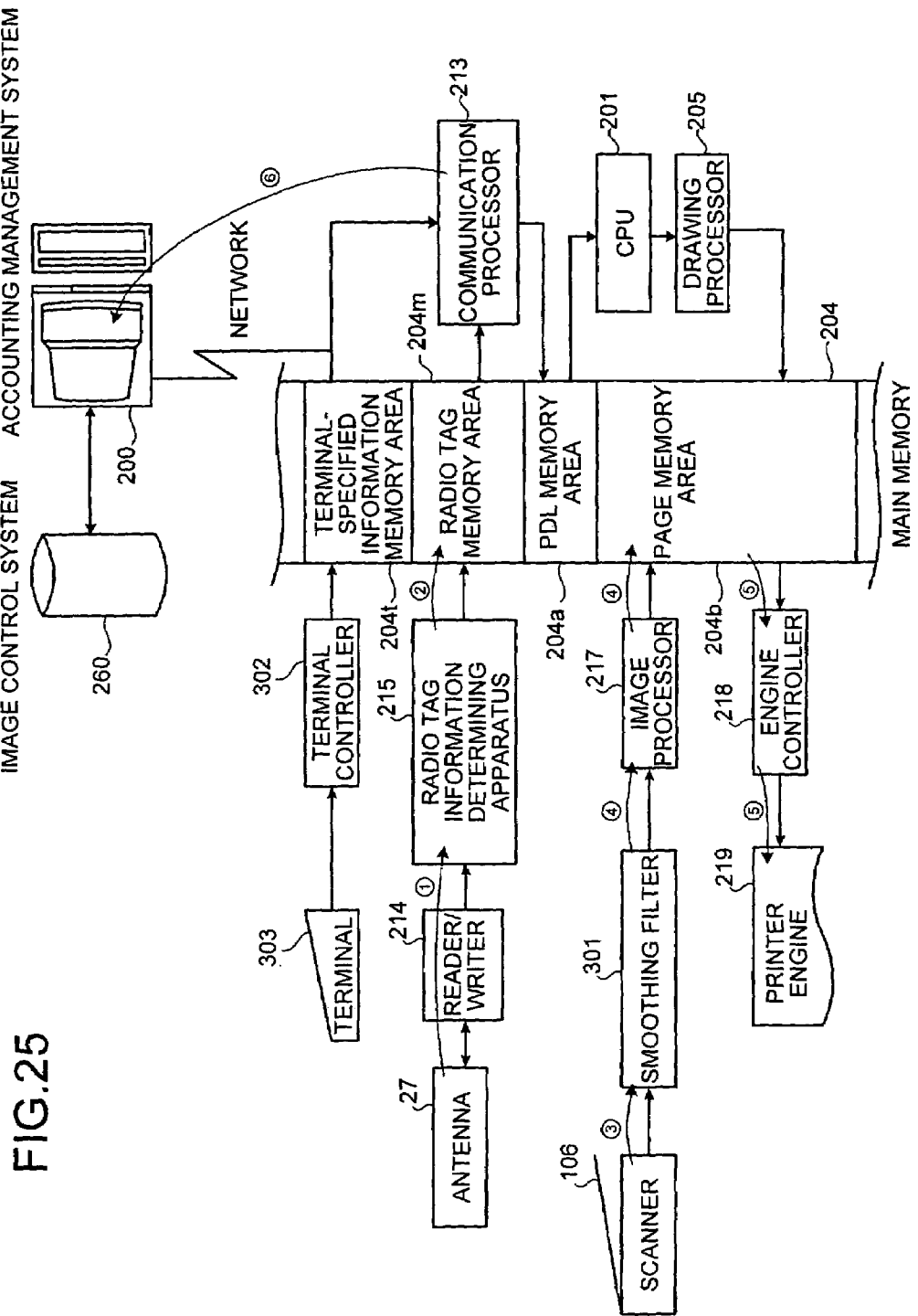
FIG. 25 is a block diagram for explaining the flow of processing in which an image is obtained from a book.

FIG. 25 is a block diagram for explaining the flow of processing in which an image is obtained from a book. A book embedded with a radio tag is placed on the scanner 106, and the content of the radio tag is read by the antenna 27. The radio tag information determining apparatus 215 recognizes the information and writes the information in the radio tag memory area 204m in the main memory 204. The communication processor 213 reads the information of the radio tag from the radio tag memory area 204m in the main memory 204, and accesses the accounting management system of a corresponding publisher via the network 50 to inquire whether the accounting management system can handle this.

Figure 26:
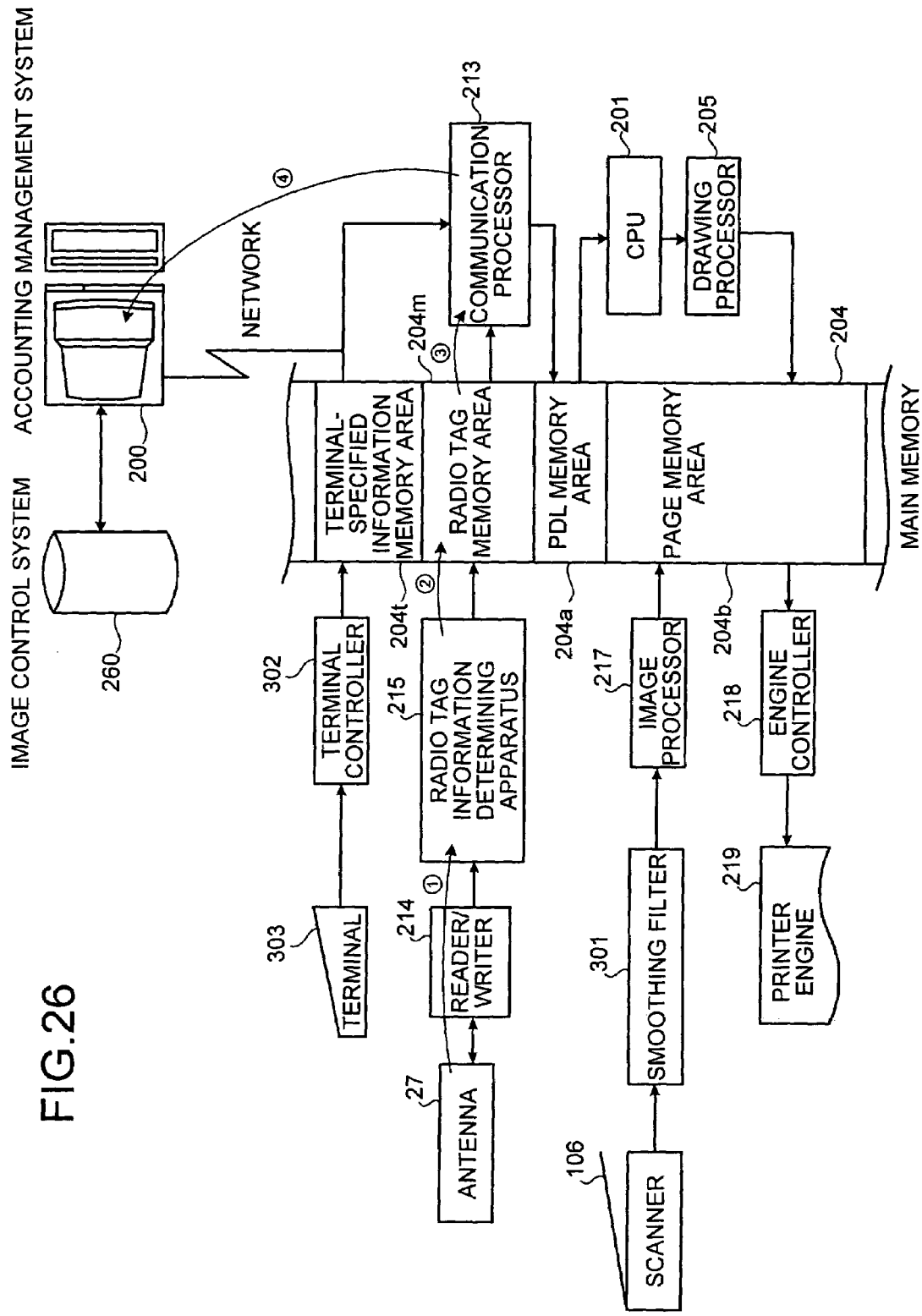
FIG. 26 is a block diagram for explaining the flow of processing when printing is performed based on page description language (PDL) data.

FIG. 26 is a block diagram for explaining the flow of processing for printing the PDL data. As shown by arrows with numbers, the processing of recognizing the radio tag of the book and inquiring to the publisher is performed.

Figure 27:
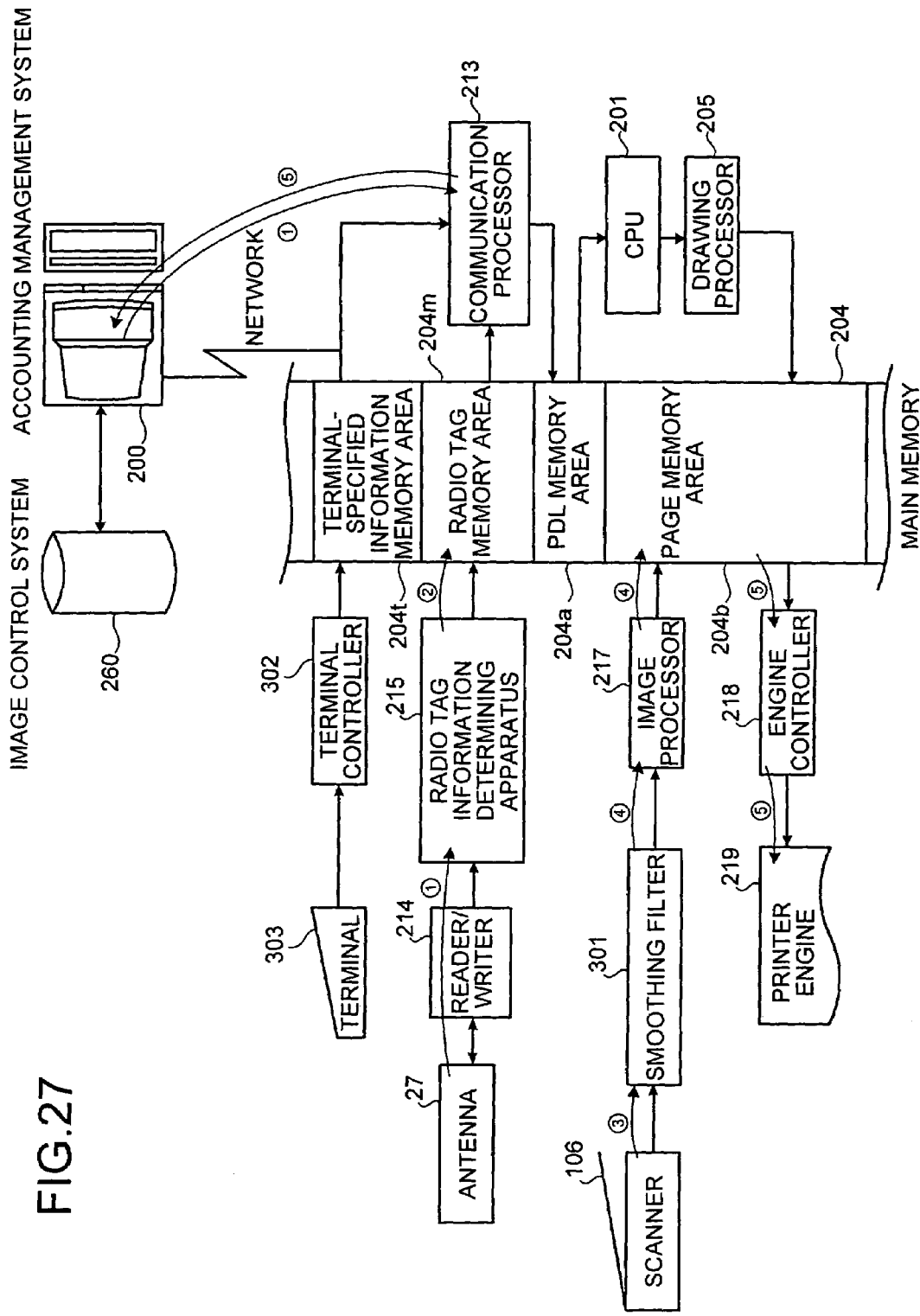
FIG. 27 is a block diagram for explaining the flow of processing when printing is performed by an accounting management system in a publisher.

FIG. 27 is a block diagram for explaining the flow of processing when printing is possible by the accounting management system of a publisher. As shown by arrows with numbers, the accounting management system in the publisher notifies the copying machine of the availability. The user inputs the page information and the like of a book, which the user wishes to obtain, by the terminal 303. The terminal controller 302 stores the information such as the number of pages and the number of copies in the terminal-specified information memory area 204t in the memory. The communication processor 213 reads the information such as the number of pages and the number of copies from the terminal-specified information memory area 204t in the memory and transmits the information to the accounting management system of the publisher via the network 50.

Figure 28:
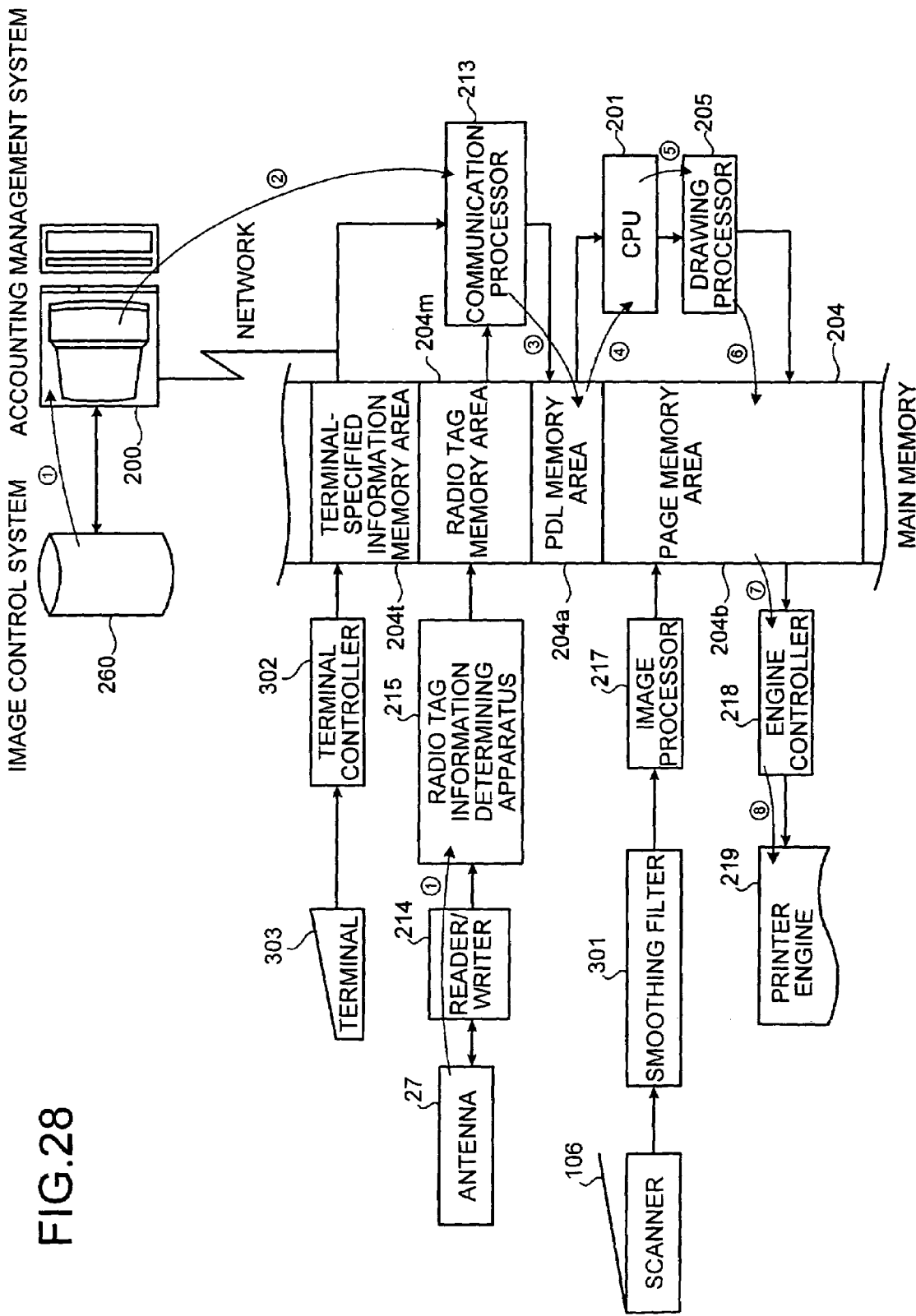
FIG. 28 is a block diagram for explaining the flow of processing when there is the PDL in the accounting management system in the publisher.

FIG. 28 is a block diagram for explaining the flow of processing when there is the PDL in the accounting management system of the publisher. As shown by arrows with numbers, the PDL in the page conformable to the accounting management system of the publisher is read from the image control system. The accounting management system of the publisher transmits the PDL via the network 50. The communication processor 213 stores the received PDL in the PDL memory area 204a of the main memory 204. The CPU 201 reads the PDL from the PDL memory area 204a of the main memory 204 and analyzes the PDL, and transmits the PDL to the drawing processor. The drawing processor 205 performs the drawing processing into the page memory area 204b of the main memory 204. When the data for one page is ready, the engine controller 218 performs printing processing of the image data. That is, the engine controller 218 searches the image data of the page from the user, and transmits the PDL to the copying machine. The copying machine analyzes the PDL and draws the page image data, and prints out the image data. At this time, the printing fee for the page is charged.

Figure 29:
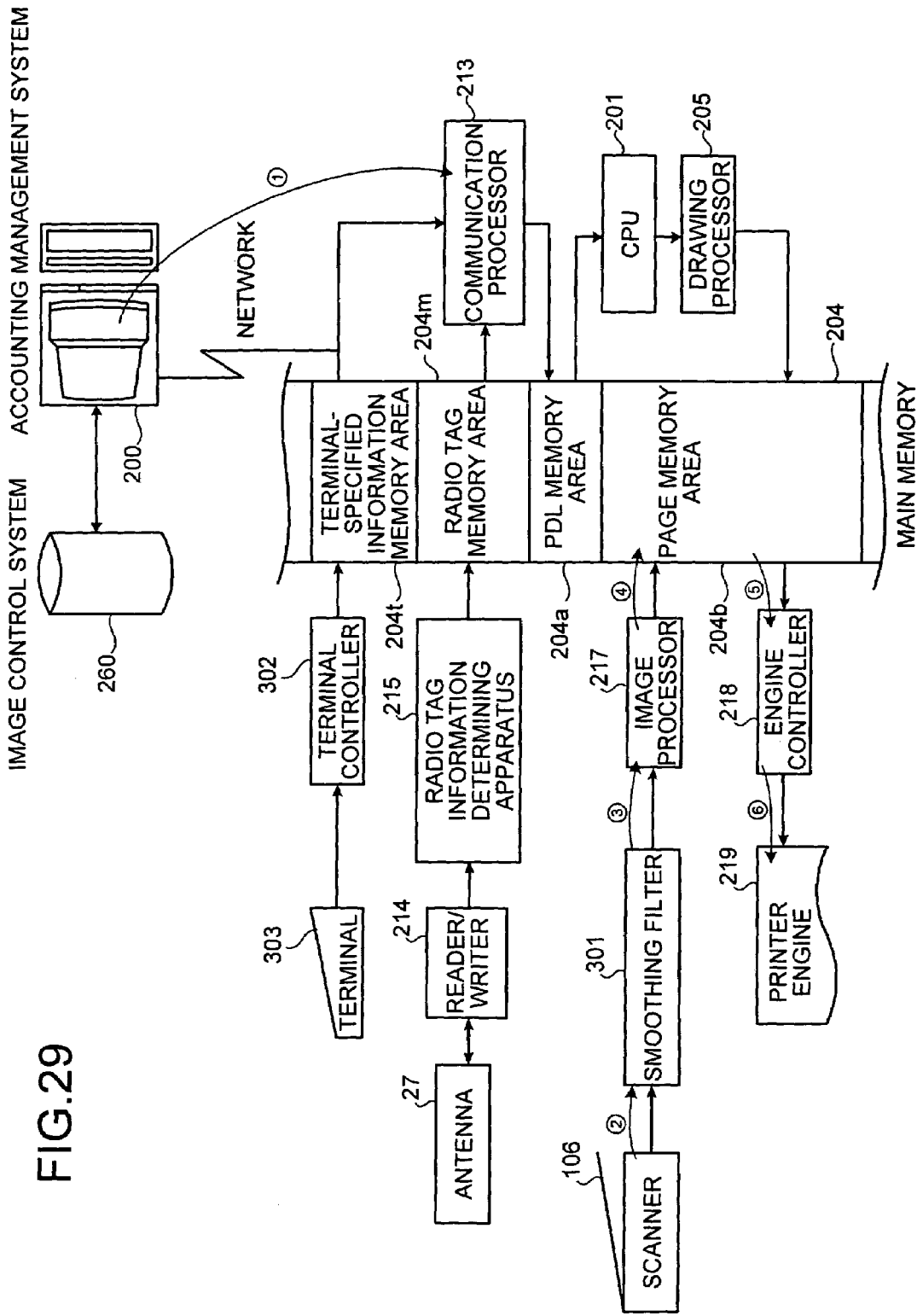
FIG. 29 is a block diagram for explaining the flow of processing when there is no PDL in the accounting management system of the publisher.

FIG. 29 is a block diagram for explaining the flow of processing when there is no PDL in the accounting management system of the publisher. As shown by arrows with numbers, the accounting management system of the publisher notifies the copying machine that there is no PDL via the network 50, and the copying machine notifies the user that there is no PDL. The user copies the page that he/she wishes. The image read from the scanner 106 is subjected to the smoothing filter processing. After the image processing, the image data is stored in the page memory area 204b of the main memory 204, and when the data for one page is stored, the image data is transmitted to the printer engine 219 and printed out.

Figure 30:
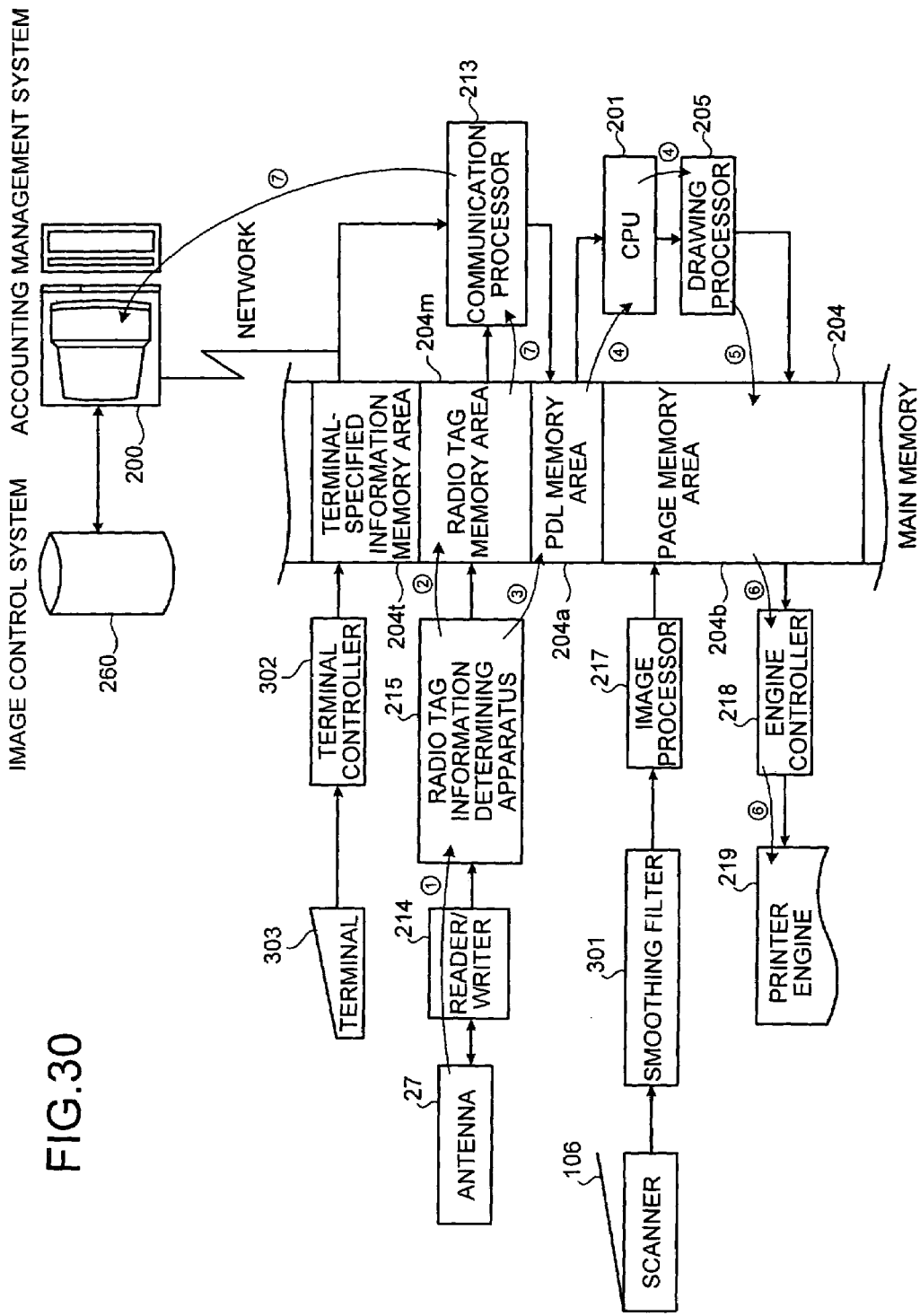
FIG. 30 is a block diagram for explaining the flow of processing when there is the PDL in the radio tag of a publication.

FIG. 30 is a block diagram for explaining the flow of processing when there is the PDL in the radio tag of a publication. As shown by arrows with numbers, the radio tag is recognized, the information of the publisher is read, the PDL is read, and by using the PDL, the specified page is printed out for the specified number. At this time, the number of prints is informed to the publisher, and the accounting processing is performed.

Figure 32:
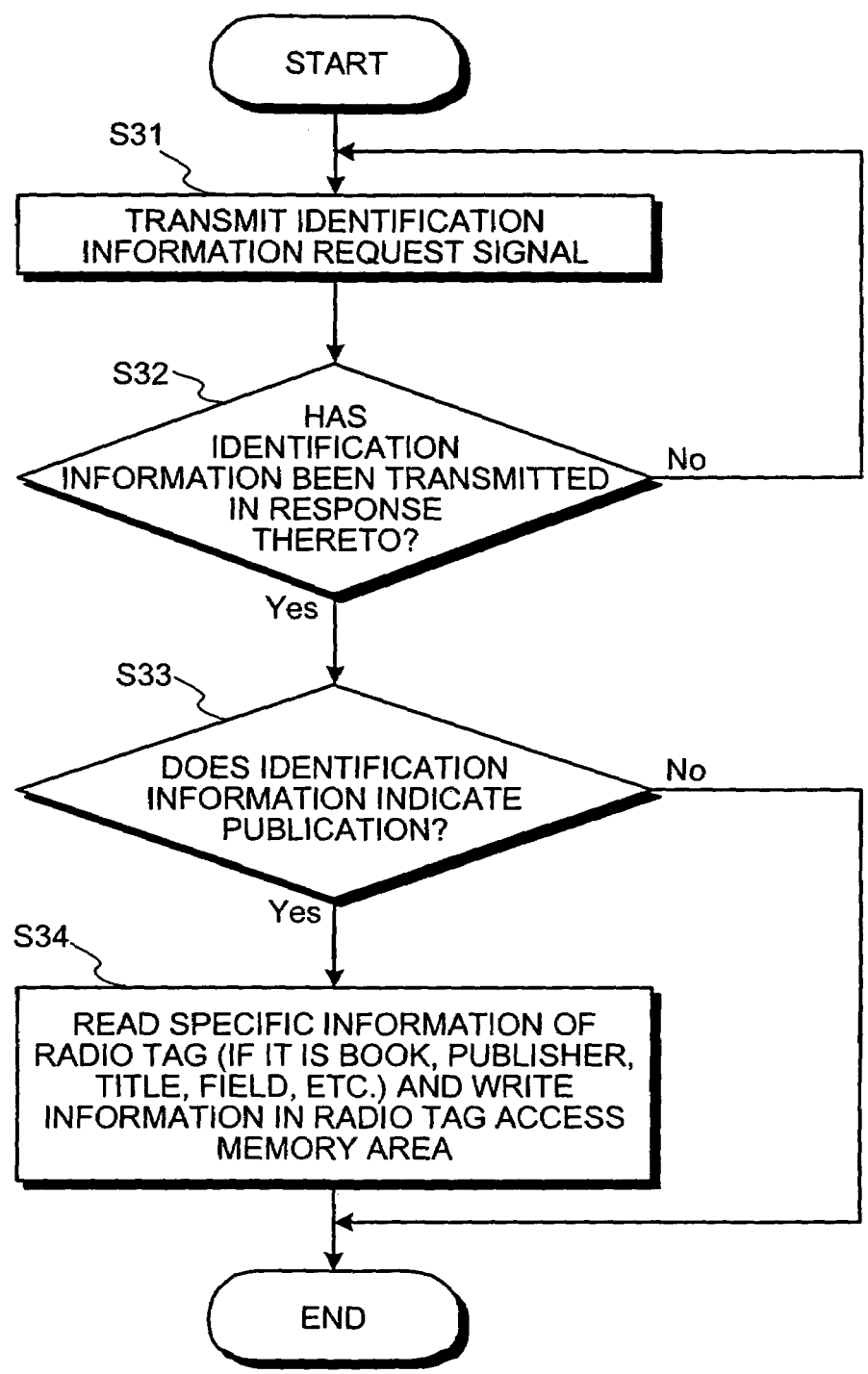
FIG. 32 is a flowchart of the communication processing between the radio tag and the image forming apparatus according to the second embodiment.

The configuration and the operation of the radio tag and the reader/writer are the same as those shown in FIG. 10. FIG. 32 is a flowchart of the communication processing with the radio tag according to the second embodiment. In FIG. 32, an identification information request signal is transmitted (step S31), and it is determined whether the response to the identification information request is performed (step S32). It is then determined whether the identification information is for a publication (step S33), and when the identification information is for a publication, the specific information of the radio tag is read and written in the radio tag memory area 204m (step S34).

According to the second embodiment, the same operation as in the first embodiment can be performed by providing the dummy antenna 29 (in the embodiment, arranged in the first carriage 150).

While a case that the PDL is processed has been explained as the PDL analyzer (CPU 201), the PDF can be used likewise. The PDL is a printer control code (language) for creating a page image in a page printer, and in many cases, functions of graphic drawing and the like are expanded, in addition to simple character printing. The representative page description language includes PostScript, Hewlett Packard Printer Control Language (HP-PCL), Laser Beam Printer Image Processing System (LIPS), Epson Standard Code/for Page Printer (ESC/Page), PRISCRIBE, and the like. The PDF is a document format developed by Adobe Systems Incorporated (United States) for realizing a displayable document without depending on a specific platform. By using the PDF, a document, which can be conventionally handled only by depending on a specific application such as various types of character decoration and column setting, can be displayed on various platforms.

According to the second embodiment, the accounting system enabling accounting can be built, by mounting the antenna 27 on the traveling unit (the first carriage 150) of the scanner 106, performing communication with the radio tag by the antenna 27 concurrently with image read, recognizing the type of radio tag, recording and adding up the copied object, the number of copies, and the like, and giving the information to the company having the copyright. Furthermore, the accounting system that can perform copy processing with good image quality and accounting can be built, by performing communication between the radio tag of the publication and the antenna 27, recognizing the type of the radio tag, the object, and the publisher, notifying the accounting system in the publisher of the page to be printed and the number of prints, and reading and printing the PDL or the PDF.

As means for obtaining electronic information directly from the document, for example, in a catalog or the like, there is one in which the Internet address to be referred to is displayed as characters on the catalog, but there is no lead of thought heretofore to obtain electronic information (digital information) directly from the document.

In the image forming apparatus according to the present invention, the radio wave transfer unit is arranged in the transport path between the carrier unit and the transfer unit, and the radio wave from the radio tag on the recording medium carried simultaneously with printing is received via the radio wave transfer unit by the radio wave generated by the radio modulator, and demodulated by the radio demodulator. Accordingly, processing corresponding to the presence of the radio tag on the recording medium and the content thereof can be performed.

In the image forming apparatus according to the present invention, the radio wave transfer unit is arranged in the transport path between the carrier unit and the transfer unit, the radio wave from the radio tag on the recording medium carried simultaneously with printing is received via the radio wave transfer unit by the radio wave generated by the radio modulator, to communicate with the radio tag on the recording medium by demodulation operation by the radio demodulator, the identification number of the radio tag is recognized by the identification number recognizing unit. It is then determined whether the identification number recognized by the forgery prevention determination unit is the one to be forgery-prevented, and the processing based on the determination result is executed. Accordingly, the forged image formation can be prevented.

In the image forming apparatus according to the present invention, the dummy radio transmitter is arranged in the carrier unit, dummy radio wave is transmitted at the time of the first printing, and it is determined whether the system that detects the radio tag on the carried recording medium operates normally. Accordingly, the forgery prevention function of the equipment can be normally operated.

In the image forming apparatus according to the present invention, since the tracking pattern data and the page image data are synthesized, prevention and tracking of forgery can be easily performed.

In the image forming apparatus according to the present invention, since the forgery prevention determination result is recoded in the header of the read image, the history of forgery can be confirmed.

In the image forming apparatus according to the present invention, the information of the read radio tag is recoded. Accordingly, the content of the read radio tag can be confirmed later.

In the image forming method according to the present invention, the radio wave from the radio tag on the recording medium carried simultaneously with printing is received at the radio wave transfer step by the radio wave generated at the radio modulation step, and demodulated at the radio demodulation step. Accordingly, the processing corresponding to the presence of the radio tag on the recording medium and the content thereof can be performed.

In the image forming method according to the present invention, the radio wave from the radio tag on the recording medium carried simultaneously with printing is received at the radio wave transfer step by the radio wave generated at the radio modulation step, to communicate with the radio tag on the recording medium by demodulation operation at the radio demodulation step, the identification number of the radio tag is recognized at the identification number recognition step. It is then determined whether the identification number recognized at the forgery prevention determination step is the one to be forgery-prevented, and the processing based on the determination result is executed. Accordingly, the forged image formation can be prevented.

In the image forming method according to the present invention, since dummy radio wave is transmitted at the time of the first printing, and it is determined whether the system that detects the radio tag on the carried recording medium operates normally, the forgery prevention function of the equipment can be normally operated.

In the image forming method according to the present invention, since the tracking pattern data and the page image data are synthesized, prevention and tracking of forgery can be easily performed.

In the image forming method according to the present invention, since the forgery prevention determination result is recoded in the header of the read image, the history of forgery can be confirmed.

In the image forming method according to the present invention, since the information of the read radio tag is recoded, the content of the read radio tag can be confirmed later.

In the image forming system according to the present invention, the radio wave transfer unit that communicates with the radio tag on the document is mounted on the traveling unit for reading the document, the communication with the radio tag is performed by the radio wave transfer unit concurrently with image read, the type of the radio tag is recognized, the copied object and the number of copies are recorded, added up, and notified to the author. Accordingly, the accounting processing corresponding to the number of copies can be performed.

In the image forming system according to the present invention, the radio wave transfer unit that communicates with the radio tag on the document is mounted on the traveling unit for reading the document, the communication with the radio tag is performed by the radio wave transfer unit concurrently with image read, to access the publisher having the copyright via the network to request the image data by the page description language, and image output by the page description language is performed. Accordingly, the accounting processing corresponding to high quality copy processing and the number of copies can be performed.

In the image forming system according to the present invention, the content of the radio tag read by the radio receiver is stored, the stored page description language is analyzed to generate page image data, and the accounting processing of the copyright fee is performed according to the content stored in the radio tag content storage unit. Accordingly, the accounting processing corresponding to the high quality copy processing and the number of copies can be performed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image of a document on a recording medium, the image forming apparatus comprising:

a transport path through which the recording medium is transported;

a transferring unit that is arranged on the transport path and transfers the image to the recording medium;

a carrying unit that is arranged on the transport path and carries the recording medium to the transferring unit;

an acquiring unit that is arranged between the carrying unit and the transferring unit and acquires identification information from a radio tag attached to the recording medium;

a dummy radio signal transmitter that transmits a dummy radio signal to the acquiring unit at a start of the image forming apparatus;

a determining unit that determines whether the identification information requires a predetermined processing for preventing a fraudulent reproduction of the document; and a processing unit that performs the predetermined processing when the identification information is determined to require the predetermined processing.

2. The image forming apparatus according to claim 1, wherein the predetermined processing includes a synthesis of an image of the document and a predetermined pattern.

3. The image forming apparatus according to claim 1, wherein the predetermined processing includes an edit of a header of the image so that the header includes a result of a determination by the determining unit.

4. The image forming apparatus according to claim 1, further comprising a storing unit that stores the identification information acquired by the acquiring unit.

5. A method of forming an image of a document on a recording medium, the method comprising:
- transferring the recording medium through a transport path;
- acquiring identification information from a radio tag attached to the recording medium while the recording medium being transferred;
- transmitting a dummy radio signal at a start of forming of the image;
- determining whether the identification information requires a predetermined processing for preventing a fraudulent reproduction of the document; and
- performing the predetermined processing when the identification information is determined to require the predetermined processing.

6. The method according to claim 5, wherein the predetermined processing includes a synthesis of an image of the document and a predetermined pattern.

7. The method according to claim 5, wherein the predetermined processing includes an edit of a header of the image so that the header includes a result of the determining.

8. The method according to claim 5, further comprising storing the identification information acquired at the acquiring.

* * * * *